United States Patent
Dai et al.

(10) Patent No.: US 8,524,388 B2
(45) Date of Patent: Sep. 3, 2013

(54) SUPERBASE-DERIVED PROTIC IONIC LIQUIDS

(75) Inventors: Sheng Dai, Knoxville, TN (US); Huimin Luo, Knoxville, TN (US); Gary A. Baker, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 751 days.

(21) Appl. No.: 12/690,224

(22) Filed: Jan. 20, 2010

(65) Prior Publication Data

US 2011/0177428 A1 Jul. 21, 2011

(51) Int. Cl.
  H01M 6/00 (2006.01)
  H01M 8/08 (2006.01)
  H01G 9/02 (2006.01)

(52) U.S. Cl.
  USPC .................. 429/122; 429/498; 252/62.2

(58) Field of Classification Search
  USPC ................ 429/122, 498; 252/62.2
  See application file for complete search history.

(56) References Cited

PUBLICATIONS

Greaves T.L. et al., "Protic Ionic Liquids: Properties and Applications", *Chem. Rev.* 108(I):206-237 (2008).
Kolomeitsev A.A. et al., "Guanidionophosphazenes: Design, Synthesis, and Basicity in THF and in the Gas Phase", *J. Am. Chem. Soc.* 127(50):17656-17666 (2005).
Fernicola A. et al., "New Types of Brönsted Acid-Base Ionic Liquids-Based Membranes for Applications in PEMFCs", *ChemPhysChem* 8:1103-1107 (2007).
Belieres J-P et al., "Binary Inorganic Salt Mixtures as High. Conductivity Liquid Electrolytes for >100° C. Fuel Cells", *Chem. Commun.* pp. 4799-4801 (2006).
Nakamoto H. et al., "Brønsted Acid-Base Ionic Liquids for Fuel Cell Electrolytes", *Chem. Commun.* pp. 2539-2541 (2007).
Susan A.B.H. et al., "Brønsted Acid-Base Ionic Liquids and Their Use as New Materials for Anydrous Proton Conductors", *Chem. Commun.* pp. 938-939 (2003).

Huang J-F et al., "A New Strategy for Synthesis of Novel Classes of Room-Temperature Ionic Liquids Based on Complexation Reaction of Cations", *Journal of the Electrochemical Society* 153(2):J9-J13 (2006).
Verkade J.G. et al., "Recent Applications of Proazaphosphatranes in Organic Synthesis", *AldrichimicaActa* 37(1):3-15 (2004).
Belieres J-P et al., "Protic Ionic Liquids: Preparation, Characterization, and Proton Free Energy Level Representation", *J. Phys. Chem. B* 111:4926-4937 (2007).
Earle M.J. et al., "The Distillation and Volatility of Ionic Liquids", *Nature* 439:831-834 (2006).
Jin H. et al., "Physical Properties of Ionic Liquids Consisting of the 1-Butyl-3-Methylimidazolium Cation With Various Anions and the Bis(Trifluoromethylsulfonyl)imide Anion With Various Cations", *J. Phys. Chem. B.* 112(1):81-92 (2008).
Ogihara W. et al., "Polarity Measurement for Ionic Liquids Containing Dissociable Protons", *Chemistry Letters* 33(11):1414-1415 (2004).
Carmichael A.J. et al., "Polarity Study of Some 1-Alkyl-3-Methylimidazolium Ambient-Temperature Ionic Liquids With the Solvatochromic Dye, Nile Red", *Journal of Physical Organic Chemistry* 13:591-595 (2000).
Luo H. et al., "Ultrastable Superbase-Derived Protic Ionic Liquids", *The Journal of Physical Chemistry B Letters* 113(13):4181-4183 (2009).

*Primary Examiner* — Johann R Richter
*Assistant Examiner* — Kofi Adzamli
(74) *Attorney, Agent, or Firm* — Scully, Scott, Murphy & Presser, P.C.

(57) ABSTRACT

Protic ionic liquids having a composition of formula (A$^-$)(BH$^+$) wherein A$^-$ is a conjugate base of an acid HA, and BH$^+$ is a conjugate acid of a superbase B. In particular embodiments, BH$^+$ is selected from phosphazenium species and guanidinium species encompassed, respectively, by the general formulas:

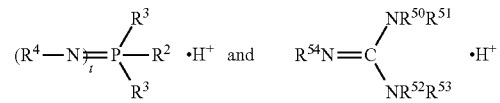

The invention is also directed to films and membranes containing these protic ionic liquids, with particular application as proton exchange membranes for fuel cells.

48 Claims, 9 Drawing Sheets

SUPERBASE-DERIVED PROTIC IONIC LIQUIDS

This invention was made with government support under Contract Number DE-AC05-00OR22725 between the United States Department of Energy and UT-Battelle, LLC. The U.S. government has certain rights in this invention.

FIELD OF THE INVENTION

The present invention relates generally to the field of ionic liquids, and more particularly, to protic ionic liquids.

BACKGROUND OF THE INVENTION

Protic ionic liquids (PILs) are being intensively studied as advanced materials for numerous specialized applications. Some of these applications include their use as proton transfer electrolytes and membranes in proton-exchange membrane fuel cells (PEMFCs), as well as their use as separation materials and solvent systems in chemical reactions.

A significant problem encountered with protic ionic liquids has been their propensity to degrade over time, and particularly, under elevated temperature conditions (e.g., temperatures greater than 100° C., as generally encountered in PEMFCs). The degradation is generally a result of retro-proton transfer between the constituent ions (i.e., conjugate base $A^-$ and conjugate acid $BH^+$) of the protic ionic liquid, depicted as follows:

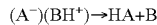

$$(A^-)(BH^+) \rightarrow HA + B$$

The resulting acid (HA) and base (B) lack strong Coulombic interactions, and thus, their generation results in a marked vaporization (i.e., volatility), and hence, increase in vapor pressure, of the ionic liquid. The degradation also leads, necessarily, to electrolyte loss. Particularly in the case of fuel cells, the electrolyte loss at higher temperatures is detrimental for several reasons, particularly in causing a reduced fuel cell operational lifetime and performance.

Accordingly, there is a need for new protic ionic liquid compositions that possess an improved stability, particularly at elevated temperatures. There is a particular need for such protic ionic liquids that also can be used as conductive components of proton exchange membranes.

SUMMARY OF THE INVENTION

In one aspect, the invention is directed to a protic ionic liquid (PIL) having a composition of formula $(A^-)(BH^+)$ wherein $A^-$ is a conjugate base of an acid HA, and $BH^+$ is a conjugate acid of a superbase B. In a particular embodiment, $BH^+$ is a phosphazeno-containing superbase. In another particular embodiment, $BH^+$ is a guanidino-containing superbase. In other embodiments, $BH^+$ is a guanidinophosphazene-containing superbase. In other particular embodiments, $A^-$ is a conjugate base of a superacid HA.

In another aspect, the invention is directed to a film (e.g., a membrane) that contains the ionic liquid described above. The film is particularly contemplated herein to be useful as a proton exchange membrane of a fuel cell.

The PIL compositions described herein are advantageously resistant to degradation by retro-proton transfer, particularly at elevated temperatures. Accordingly, the PIL compositions described herein are more suited than conventional ionic liquids of the art for use in high temperature applications, such as in proton exchange membranes of PEM-type fuel cells.

BRIEF DESCRIPTION OF THE DRAWINGS

FIG. 8C shows Nile Red in various water-to-ethanol volume ratio solutions.

DETAILED DESCRIPTION OF THE INVENTION

Figure 1:
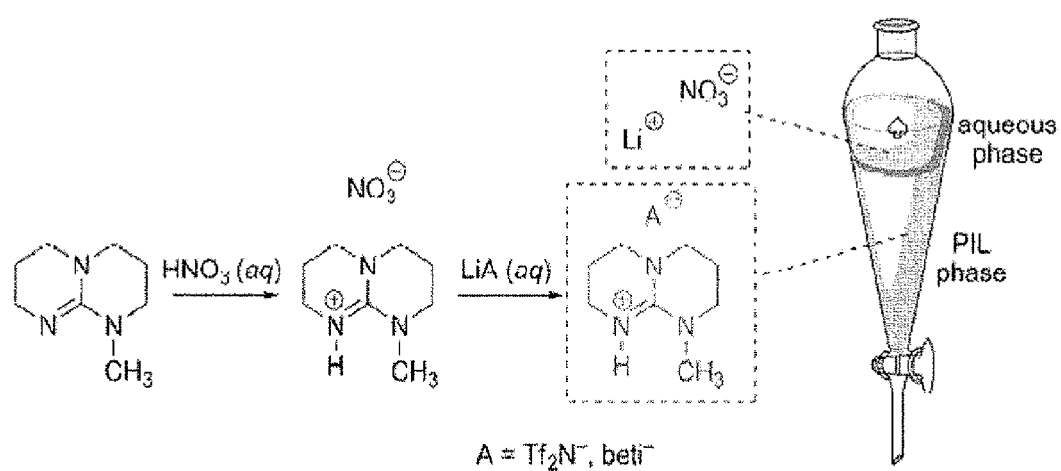
FIG. 1. Scheme showing a general method for preparation of the protic ionic liquids of the invention.

The terms "hydrocarbon group" and "hydrocarbon linker", as used herein, are, in a first embodiment, composed solely of carbon and hydrogen. In different embodiments, one or more of the hydrocarbon groups or linkers can contain precisely, or a minimum of, or a maximum of, for example, one, two, three, four, five, six, seven, eight, nine, ten, eleven, twelve, thirteen, fourteen, fifteen, sixteen, seventeen, or eighteen carbon atoms, or a particular range of carbon atoms between any of the foregoing carbon numbers. Hydrocarbon groups of different ionic liquid compounds described herein may possess the same or different number (or preferred range thereof) of carbon atoms in order to independently adjust or optimize one or more characteristics of each type of ionic liquid.

The hydrocarbon groups or linkers can be, for example, saturated and straight-chained (i.e., straight-chained alkyl groups or alkylene linkers). Some examples of straight-chained alkyl groups (or alkylene linkers) include methyl (or methylene, i.e., —$CH_2$—, or methine linkers), ethyl (or ethylene or dimethylene, i.e., —$CH_2CH_2$— linkers), n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl groups.

The hydrocarbon groups or linkers can alternatively be saturated and branched (i.e., branched alkyl groups or alkylene linkers). Some examples of branched alkyl groups include isopropyl, isobutyl, sec-butyl, t-butyl, isopentyl, neopentyl, 2-methylpentyl, 3-methylpentyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ saturated and branched hydrocarbon groups. Some examples of branched alkylene linkers are those derived by removal of a hydrogen atom from one of the foregoing exemplary branched alkyl groups (e.g., isopropylene, —CH(CH$_3$)CH$_2$—).

The hydrocarbon groups or linkers can alternatively be saturated and cyclic (i.e., cycloalkyl groups or cycloalkylene linkers). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane). Some examples of cycloalkylene linkers are those derived by removal of a hydrogen atom from one of the foregoing exemplary cycloalkyl groups.

The hydrocarbon groups or linkers can alternatively be unsaturated and straight-chained (i.e., straight-chained olefinic or alkenyl groups or linkers). The unsaturation occurs by the presence of one or more carbon-carbon double bonds and/or one or more carbon-carbon triple bonds. Some examples of straight-chained olefinic groups include vinyl, 2-propen-1-yl (allyl), 3-buten-1-yl, 2-buten-1-yl, butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and straight-chained hydrocarbon groups. Some examples of straight-chained olefinic linkers are those derived by removal of a hydrogen atom from one of the foregoing exemplary straight-chained olefinic groups (e.g., vinylene, —CH═CH—, or vinylidene).

The hydrocarbon groups or linkers can alternatively be unsaturated and branched (i.e., branched olefinic or alkenyl groups or linkers). Some examples of branched olefinic groups include 2-propen-2-yl, 3-buten-2-yl, 3-buten-3-yl, 4-penten-2-yl, 4-penten-3-yl, 3-penten-2-yl, 3-penten-3-yl, 2,4-pentadien-3-yl, and the numerous $C_6$, $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and branched hydrocarbon groups. Some examples of branched olefinic linkers are those derived by removal of a hydrogen atom from one of the foregoing exemplary branched olefinic groups.

The hydrocarbon groups or linkers can alternatively be unsaturated and cyclic (i.e., cycloalkenyl groups or cycloalkenylene linkers). Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic (e.g., bicyclic) group by either possessing a bond between two of the ring groups (e.g., biphenyl) or a shared (i.e., fused) side (e.g., naphthalene, anthracene, phenanthrene, phenalene, and indene). Some examples of cycloalkenylene linkers are those derived by removal of a hydrogen atom from one of the foregoing exemplary cycloalkenyl groups (e.g., phenylene and biphenylene).

One or more of the hydrocarbon groups or linkers may also include one or more heteroatoms (i.e., non-carbon and non-hydrogen atoms), such as one or more heteroatoms selected from oxygen, nitrogen, sulfur, halide, and phosphorus atoms.

Some examples of oxygen-containing groups include hydroxyl (OH) groups, carbonyl groups (e.g., ketone, aldehyde, ester, amide, or urea functionalities), and carbon-oxygen-carbon (ether) groups. The ether group can also be a polyalkyleneoxide group, such as a polyethyleneoxide group. Some examples of nitrogen-containing groups include primary amine groups, secondary amine groups, tertiary amine groups, quaternary amine groups, cyanide group, amide group (i.e., —C(O)NR$_2$, wherein R is independently selected from hydrogen atom and hydrocarbon group, as described above), nitro group, urea group, imino group, and carbamate group, wherein it is understood that a quaternary amine group necessarily possesses a positive charge and requires a counteranion. Some examples of sulfur-containing groups include mercapto (i.e., —SH), thioether (i.e., sulfide), disulfide, sulfoxide, sulfone, sulfonate, and sulfate groups. Halide atoms considered herein include fluorine, chlorine, and bromine. Some examples of fluorine-containing hydrocarbon groups (i.e., fluorocarbon groups) include the partially-substituted varieties (e.g., fluoromethyl, difluoromethyl, 2-fluoroethyl, 2,2-difluoroethyl, 2,2,2-trifluoroethyl, fluorobenzene, fluorobenzyl, and the like) and perfluoro-substituted varieties (e.g., perfluoromethyl, perfluoroethyl, perfluoropropyl, perfluorobutyl, pentafluorophenyl, and the like). Some examples of phosphorus-containing groups include dialkylphosphine, dialkenylphosphine, arylphosphine, diarylphosphine, phosphinidene, phosphazene, phosphine oxide, phosphinite, phosphinate, phosphonite, phosphonate, phosphite, phosphate, and phosphonium groups.

Of the heteroatom groups described above, particular consideration is given to amino groups, such as described by the following formula:

$$-NR^{12}R^{13} \qquad (1)$$

In formula (4) above, $R^{12}$ and $R^{13}$ are each independently selected from a hydrogen atom and any of the hydrocarbon groups described above, including unsubstituted and heteroatom-substituted hydrocarbon groups. The hydrocarbon groups particularly considered herein for $R^{12}$ and $R^{13}$ contain at least one, two, or three carbon atoms and up to four, five, six, seven, or eight carbon atoms.

The groups $R^{12}$ and $R^{13}$ in formula (1) can, in one embodiment, be non-interconnected. Some examples of amino groups according to formula (1) in which $R^{12}$ and $R^{13}$ are non-interconnected include amino (—NH$_2$), methylamino (—N(H)CH$_3$), dimethylamino (dma), ethylamino, diethylamino, n-propylamino, di(n-propyl)amino, isopropylamino, diisopropylamino, n-butylamino, di(n-butyl)amino, isobutylamino, diisobutylamino, sec-butylamino, di(sec-butyl)amino, t-butylamino, di(t-butyl)amino, n-pentylamino, di(n-pentyl)amino, isopentylamino, diisopentylamino, neopentylamino, n-hexylamino, di(n-hexyl)amino, isohexylamino, n-heptylamino, n-octylamino, di(n-octyl)amino, isooctylamino, vinylamino, allylamino, diallylamino, cyclobutylamino, cyclopentylamino, cyclohexylamino, phenylamino, diphenylamino, benzylamino, dibenzylamino, hydroxymethylamino (HOCH$_2$NH—), di(hydroxymethyl)amino, methoxymethylamino, hydroxyethylamino, di(hydroxyethyl)amino, methoxyethylamino, ethoxyethylamino, 2-(hydroxy)ethoxy-methylamino (HOCH$_2$CH$_2$OCH$_2$NH—), 2-[2-(hydroxy)ethoxy]ethylamino (HOCH$_2$CH$_2$OCH$_2$CH$_2$NH—), aminomethylamino (H$_2$NCH$_2$NH—), and 2-aminoethylamino (H$_2$NCH$_2$CH$_2$NH—) groups.

In another embodiment, the groups $R^{12}$ and $R^{13}$ in formula (1) are interconnected, thereby making the amino group of formula (1) an amino-containing ring group. Some examples of amino groups according to formula (1) in which $R^{12}$ and $R^{13}$ are interconnected include azacyclopropyl (aziridinyl or dimethyleneiminyl), azacyclobutyl (azetidinyl or trimethyleneiminyl), pyrrolidinyl, pyrrolyl, imidazolyl, imidazolidinyl, oxazolyl, pyrazolyl, piperidinyl, piperazinyl, morpholinyl, pyridinyl, pyrimidinyl, pyrazinyl, triazinyl, triazacyclohexyl, azacycloheptyl (homopiperidinyl), azacylooctyl, indolyl, benzimidazolyl, purinyl, quinolinyl, decahydroquinolinyl, and bipyridyl groups.

The groups $R^{12}$ and $R^{13}$ in formula (1) can also together represent a double bond connecting the shown nitrogen atom to a carbon atom, with the result of forming an imino group, as represented by the following formula:

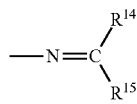

(1a)

In formula (1a), $R^{14}$ and $R^{15}$ can independently be selected from a hydrogen atom, any of the substituted or unsubstituted hydrocarbon groups described above bound to the shown C atom by a carbon atom, or an amino group (as depicted by formula (1)) bound to the shown C atom by its nitrogen atom. $R^{14}$ and $R^{15}$ can also be either non-interconnected or interconnected. In a first embodiment, both $R^{14}$ and $R^{15}$ are hydrogen atoms. In a second embodiment, $R^{14}$ is a hydrogen atom and $R^{15}$ is a hydrocarbon group. In a third embodiment, $R^{14}$ is a hydrogen atom and $R^{15}$ is an amino group. In a fourth embodiment, both of $R^{14}$ and $R^{15}$ are hydrocarbon groups. In a fifth embodiment, $R^{14}$ is a hydrocarbon group and $R^{15}$ is an amino group. In a sixth embodiment, both of $R^{14}$ and $R^{15}$ are amino groups. When $R^{14}$ and $R^{15}$ are both amino groups, formula (1a) represents a guanidino group. The guanidino group is an acyclic guanidino group when $R^{14}$ and $R^{15}$ are non-interconnected. The guanidino group is a cyclic guanidino group when $R^{14}$ and $R^{15}$ are interconnected. Some particular examples of cyclic guanidine groups include imidazolidin-2-ylideneamino, 1,3-dihydro-2H-imidazol-2-ylideneamino, and (1,3-dimethylimidazolidin-2-ylidene) amino.

The groups $R^{12}$ and $R^{13}$ in formula (1) can also together represent a double bond connecting the shown nitrogen atom to a phosphorus atom, with the result of forming a phosphazeno group, as represented by the following formula:

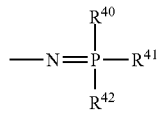

(1b)

In formula (1b), $R^{40}$, $R^{41}$ and $R^{42}$ can independently be selected from amino groups, as shown in formula (1), bound to the shown P atom by a nitrogen atom; and imino groups, as shown in formula (1a), bound to the shown P atom by a nitrogen atom; and any of the substituted or unsubstituted hydrocarbon groups described above bound to the shown P atom by a carbon atom. In a first embodiment, all of $R^{40}$, $R^{41}$ and $R^{42}$ are selected from any of the hydrocarbon groups described above. In a second embodiment, two of $R^{40}$, $R^{41}$ and $R^{42}$ are selected from hydrocarbon groups while one of $R^{40}$, $R^{41}$ and $R^{42}$ is an amino group or imino group. In a third embodiment, two of $R^{40}$, $R^{41}$ and $R^{42}$ are selected from any of the amino and/or imino groups described above, while one of $R^{40}$, $R^{41}$ and $R^{42}$ is a hydrocarbon group. In a fourth embodiment, all of $R^{40}$, $R^{41}$ and $R^{42}$ are selected from any of the amino and/or imino groups described above. In one embodiment, $R^{40}$, $R^{41}$ and $R^{42}$ are non-interconnected. In other embodiments, two or three of $R^{40}$, $R^{41}$ and $R^{42}$ are interconnected.

In formula (1b), one, two, or all of $R^{40}$, $R^{41}$ and $R^{42}$ can, themselves, also be phosphazeno groups as depicted in formula (1b). The foregoing three embodiments are encompassed by the following three subformulas of formula (1b):

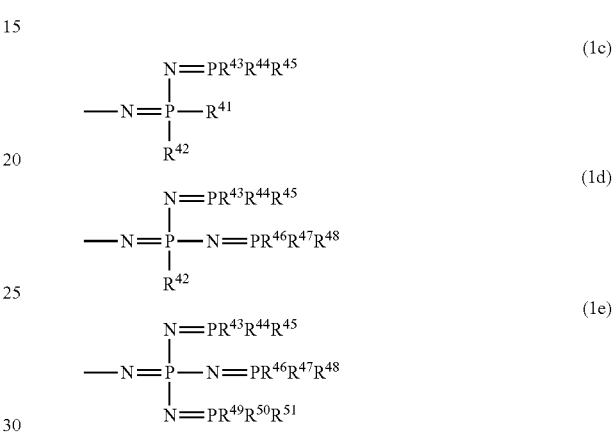

In formulas (1c), (1d), and (1e), $R^{43}$, $R^{44}$, $R^{45}$, $R^{46}$, $R^{47}$, $R^{48}$, $R^{49}$, $R^{50}$, and $R^{51}$ are independently selected from unsubstituted or heteroatom-substituted hydrocarbon groups, and/or amino groups according to formula (1), and/or imino groups according to formula (1a), and/or phosphazeno groups according to formula (1b).

In one aspect, the invention is directed to novel protic ionic liquid (PIL) compositions. The PIL compositions can be conveniently described by the formula $(A^-)(BH^+)$, wherein $A^-$ is a conjugate base of an acid HA, and $BH^+$ is a conjugate acid of a superbase B. The foregoing formula is meant to encompass a conjugate base having any valency of negative charge and a conjugate acid having any valency of positive charge, provided that the charge contributions from the conjugate base and conjugate acid are counterbalanced in order for charge neutrality to be preserved in the ionic liquid molecule. More specifically, the formula $(A^-)(BH^+)$ is meant to encompass the more generic formula $(A^{-a})_x(BH^{+b})_y$, wherein the variables a and b are, independently, non-zero integers, and the variables x and y are, independently, non-zero integers, such that $a.x=b.y$ (wherein the period placed between variables indicates multiplication of the variables). The foregoing generic formula encompasses numerous possible sub-formulas, such as, for example, $(A^-)(BH^+)$, $(A^{-2})(BH^+)_2$, $(A^-)_2(BH^{+2})$, $(A^{-2})_2(BH^{+2})_2$, $(A^{-3})(BH^+)_3$, $(A^-)_3(BH^{+3})$, $(A^{-3})_2(BH^{+2})_3$, and $(A^{-2})_3(BH^{+3})_2$.

The superbase B can be any superbase. Generally, a superbase is distinguished from an ordinary base by having an acid dissociation constant, i.e., pKa, of its conjugate acid $BH^+$, of 20 or above in acetonitrile (or 12 or above in water). In other embodiments, the superbase is characterized by having a pKa of its conjugate acid $BH^+$ of at least 21, 22, 23, 24, 25, 26, 27, 28, 29, or 30 in acetonitrile, or at least 13, 14, 15, or 16 in water.

In one embodiment, BH⁺ has a phosphazene composition within the following generic formula:

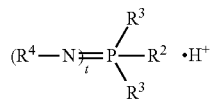

(2)

In formula (2) above, $R^1$, $R^2$, and $R^3$ are each independently selected from any of the unsubstituted or heteroatom-substituted hydrocarbon groups described above and bound to the shown P atom by a carbon atom; and/or amino groups of formula (1) bound to the P atom shown in formula (2) by the nitrogen atom shown in formula (1); and/or imino groups of formula (1a) bound to the P atom shown in formula (2) by the nitrogen shown in formula (1a); and/or phosphazeno groups of formulas (1b), (1c), (1d), and/or (1e) bound to the P atom shown in formula (2) by the nitrogen shown in formulas (1b), (1c), (1d), and/or (1e). The group $R^4$ is either a hydrogen atom or any of the unsubstituted or heteroatom-substituted hydrocarbon groups described above. When $R^4$ is a heteroatom-substituted hydrocarbon group, $R^4$ can be bound to the shown nitrogen atom by a carbon atom, or a heteroatom, such as a phosphorus atom (thereby forming an additional phosphazene bond) or nitrogen atom (thereby forming a diazene bond). The subscript t is 0 or 1, to indicate, respectively, the absence or presence of the group $R^4$—N=. A provision is made that, when t is 0, at least one (i.e., one, two, or all) of $R^1$, $R^2$, and $R^3$ is selected from amino groups according to formula (1) and/or imino groups according to formula (1a) and/or phosphazeno groups according to formulas (1b), (1c), (1d), and/or (1e). The hydrogen ion depicted in formula (2) by the symbol .H⁺ is typically attached to one or more nitrogen or phosphorus atoms of the chemical structure.

In one embodiment, $R^1$, $R^2$, $R^3$, and $R^4$ of formula (2) are not interconnected. In another embodiment, two of $R^1$, $R^2$, $R^3$, and $R^4$ of formula (2) are interconnected by one or more covalent chemical bonds (e.g., carbon-carbon, carbon-oxygen, and/or carbon-nitrogen bonds). When two of $R^1$, $R^2$, and $R^3$ are interconnected, a phosphorus-containing ring results, which includes the phosphorus atom shown in formula (2). In another embodiment, all of $R^1$, $R^2$, and $R^3$ of formula (2) are interconnected by covalent chemical bonds. When all of $R^1$, $R^2$, and $R^3$ are interconnected, a phosphorus-containing bicyclic ring system results, which includes the phosphorus atom shown in formula (2). When one or more of $R^1$, $R^2$, and $R^3$ are selected from amino groups, and/or imino groups, and/or phosphazeno groups (i.e., according to, respectively, formulas (1), (1a), or (1b)), an interconnection of two or three of $R^1$, $R^2$, and $R^3$ results, respectively, in a phosphazene-containing ring or bicyclic ring system, which includes the phosphorus atom shown in formula (2) and one or more nitrogen atoms of the one or more amino, imino, and/or phosphazeno groups.

In a particular embodiment of formula (2), t is 1, and thus, formula (2) encompasses phosphazene species of the following chemical formula:

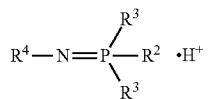

(2a)

The groups $R^1$, $R^2$, $R^3$, and $R^4$ of formula (2a) retain their meanings as described above for formula (2). Particularly contemplated herein for formula (2a) are the species that result when $R^1$, $R^2$, and $R^3$ are independently selected from unsubstituted or heteroatom-substituted hydrocarbon groups, and particularly, hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups), and/or amino groups according to formula (1), and/or imino groups according to formula (1a), and/or phosphazeno groups according to formulas (1 b), (1c), (1d), and/or (1e), and $R^4$ is a hydrogen atom or any of the foregoing exemplary hydrocarbon groups. In a first set of embodiments, all three of $R^1$, $R^2$, and $R^3$ are independently selected from hydrocarbon groups, and particularly, any of the foregoing exemplary hydrocarbon groups. In a second set of embodiments, two of $R^1$, $R^2$, and $R^3$ are independently selected from hydrocarbon groups, and one of $R^1$, $R^2$, and $R^3$ is selected from any of the amino groups according to formula (1), and/or imino groups according to formula (1a), and/or phosphazeno groups according to formulas (1b), (1c), (1d), and/or (1e). In a third set of embodiments, one of $R^1$, $R^2$, and $R^3$ is selected from hydrocarbon groups, and two of $R^1$, $R^2$, and $R^3$ are independently selected from any of the amino groups according to formula (1), and/or imino groups according to formula (1a), and/or phosphazeno groups according to formulas (1b), (1c), (1d), and/or (1e). In a fourth set of embodiments, all three of $R^1$, $R^2$, and $R^3$ are independently selected from any of the amino groups according to formula (1), and/or imino groups according to formula (1a), and/or phosphazeno groups according to formulas (1b), (1c), (1d), and/or (1e).

In another particular embodiment of formula (2), t is 0, and thus, formula (2) encompasses phosphazene species of the following chemical formula:

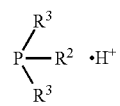

(2b)

The groups $R^1$, $R^2$, and $R^3$ of formula (2b) retain their meanings as described above for formulas (2) and (2a), with the provision that at least one (i.e., one, two, or all) of $R^1$, $R^2$, and $R^3$ is selected from amino groups according to formula (1), and/or imino groups according to formula (1a), and/or phosphazeno groups according to formulas (1b), (1c), (1d), and/or (1e). The second, third, and fourth exemplary sets of embodiments for $R^1$, $R^2$, and $R^3$ described above under formula (2a) are also incorporated herein.

In another particular embodiment of formula (2), $R^1$, $R^2$, and $R^3$ are amino groups according to formula (1), and thus, formula (2) encompasses phosphazene species within the following chemical formula:

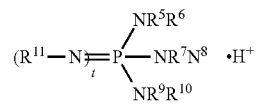

(3)

In formula (3), $R^5$, $R^6$, $R^7$, $R^8$, $R^9$, $R^{10}$, and $R^{11}$ are each independently selected from a hydrogen atom and any of the substituted or unsubstituted hydrocarbon groups described above. Optionally, two, three, or more of $R^5$, $R^6$, $R^7$, $R^8$, $R^9$, and $R^{10}$ are interconnected. The subscript t is 0 or 1, as described above. In particular embodiments, at least one, two, three, four, five, or all of $R^5$, $R^6$, $R^7$, $R^8$, $R^9$, and $R^{10}$ are independently selected from hydrocarbon groups, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups), and if $R^{11}N=$ is present, $R^{11}$ is a hydrogen atom or any of the foregoing exemplary hydrocarbon groups.

In a particular embodiment of formula (3), t is 1, and thus, formula (3) encompasses phosphazene species of the following chemical formula:

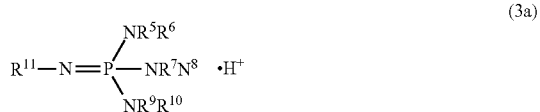
(3a)

In formula (3a), $R^5$, $R^6$, $R^7$, $R^8$, $R^9$, $R^{10}$, and $R^{11}$ retain their meanings as given under formula (3). All exemplary embodiments given above for these groups are also incorporated herein. In a particular embodiment, two of $R^5$, $R^6$, $R^7$, $R^8$, $R^9$, and $R^{10}$ are interconnected to form a cyclic phosphazene structure, such as the following structure:

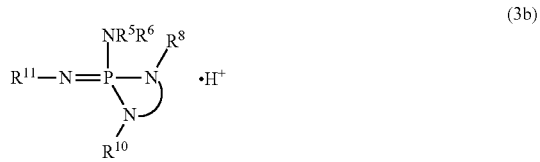
(3b)

In formula (3b), $R^5$, $R^6$, $R^8$, $R^{10}$, and $R^{11}$ retain their meanings as given under formula (3). All exemplary embodiments given above for these groups are also incorporated herein. In particular embodiments of formula (3b), $R^5$, $R^6$, $R^8$, $R^{10}$, and $R^{11}$ are independently selected from hydrocarbon groups containing 1 to 4 carbon atoms, and particularly, straight-chained or branched alkyl groups containing 1 to 4 carbon atoms. The curved line in formula (3b) represents a hydrocarbon linker, such as any of the linkers described above, and particularly, an ethylene or trimethylene linker.

In other particular embodiments of formula (3), at least one of the shown amino groups (i.e., one, two, or all of $-NR^5R^6$, $-NR^7R^8$, and $-NR^9R^{10}$) is independently selected from imino groups of formula (1a) and/or phosphazeno groups of formulas (1b), (1c), (1d), and/or (1e).

In the particular case when all of the shown amino groups of formula (3) are imino groups of formula (1), formula (3) encompasses phosphazene species of the following chemical formula:

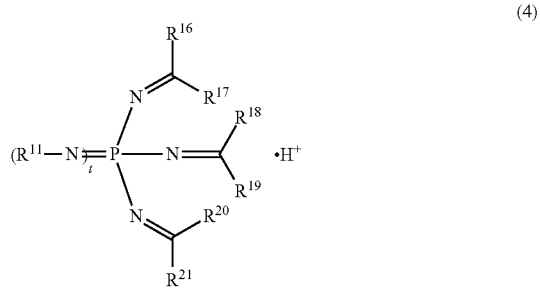
(4)

In formula (4) above, $R^{11}$, $R^{16}$, $R^{17}$, $R^{18}$, $R^{19}$, $R^{20}$, and $R^{21}$ are each independently selected from a hydrogen atom, and/or substituted or unsubstituted hydrocarbon groups, and/or amino groups according to formula (1), and/or imino groups according to formula (1a), and/or phosphazeno groups according to formulas (1b), (1c), (1d), and/or (1e), all as described above. The subscript t is 0 or 1, as described above. In particular embodiments of formula (4), at least one, two, three, four, five, or all of $R^{16}$, $R^{17}$, $R^{18}$, $R^{19}$, $R^{20}$, and $R^{21}$ are independently selected from hydrocarbon groups, and particularly, hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups), and if $R^{11}N=$ is present, $R^{11}$ is a hydrogen atom or any of the foregoing exemplary hydrocarbon groups. In other embodiments of formula (4), at least one of $R^{16}$, $R^{17}$, $R^{18}$, $R^{19}$, $R^{20}$, and $R^{21}$ (i.e., one, two, three, four, five, or all of $R^{16}$, $R^{17}$, $R^{18}$, $R^{19}$, $R^{20}$, and $R^{21}$) is selected from amino groups according to formula (1), and/or imino groups according to formula (1a), and/or phosphazeno groups according to formulas (1b), (1c), (1d), and/or (1e).

Optionally, two or more of $R^{11}$, $R^{16}$, $R^{17}$, $R^{18}$, $R^{19}$, $R^{20}$, and $R^{21}$ are interconnected. When only $R^{16}$ and $R^{17}$, or $R^{18}$ and $R^{19}$, or $R^{20}$ and $R^{21}$, or a combination thereof, are interconnected, a cyclic imino group results, but the imino groups are not interconnected to each other (and thus, the resulting ring does not include the shown phosphorus atom). When groups belonging to different imino groups interconnect with each other (e.g., $R^{16}$ and $R^{17}$), then a cyclic phosphazene species results which contains one or more rings that include the shown phosphorus atom. In other embodiments, $R^{11}$, $R^{16}$, $R^{17}$, $R^{18}$, $R^{19}$, $R^{20}$, and $R^{21}$ are not interconnected.

In a particular embodiment of formula (4), t is 1, and thus, formula (4) encompasses phosphazene species of the following chemical formula:

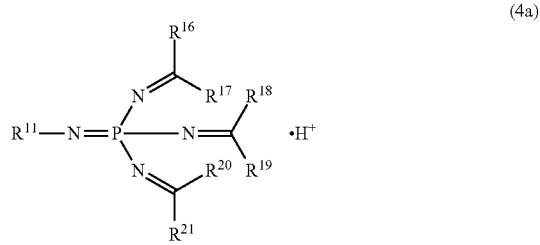
(4a)

In formula (4a) above, $R^{11}$, $R^{16}$, $R^{17}$, $R^{18}$, $R^{19}$, $R^{20}$, and $R^{21}$ retain their meanings as given under formula (4). All exemplary embodiments given above for these groups are also incorporated herein.

In the particular case when all of the shown amino groups of formula (3) are phosphazeno groups of formulas (1b), (1c), (1d), and/or (1e), formula (3) encompasses phosphazene species of the following chemical formula:

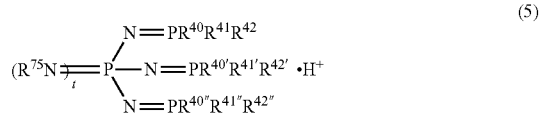
(5)

In formula (5), $R^{40}$, $R^{41}$, $R^{42}$, $R^{40'}$, $R^{41'}$, $R^{42'}$, $R^{40''}$, $R^{41''}$, and $R^{42''}$ are as defined under formula (1b), i.e., independently selected from unsubstituted or heteroatom-substituted hydrocarbon groups, and/or amino groups according to formula (1), and/or imino groups according to formula (1a), and/or phosphazeno groups according to formulas (1b), (1c), (1d), and/or (1e). The group $R^{75}$ is selected from a hydrogen atom or unsubstituted or heteroatom-substituted hydrocarbon group, as described above, including particular exemplary embodiments. In a first set of embodiments, at least one (i.e., one, two, three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from hydrocarbon groups. In a second set of embodiments, at least one (i.e., one, two, three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from amino groups according to formula (1). In a third set of embodiments, at least one (i.e., one two, three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from imino groups according to formula (1a). In a fourth set of embodiments, at least one (i.e., one, two, three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from phosphazeno groups according to formulas (1b), (1c), (1d), and/or (31e). In a fifth set of embodiments of formula (5), $R^{75}$ is a hydrocarbon group, and particularly, a hydrocarbon group containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In addition, any two or more of $R^{40}$, $R^{41}$, $R^{42}$, $R^{40'}$, $R^{41'}$, $R^{42'}$, $R^{40''}$, $R^{41''}$, $R^{42''}$, and $R^{75}$ may be interconnected. For example, two or three of $R^{40}$, $R^{41}$, and $R^{42}$, and/or two or three of $R^{43}$, $R^{44}$, and $R^{45}$, and/or two or three of $R^{46}$, $R^{47}$, and $R^{48}$, may be interconnected.

In a particular embodiment of formula (5), t is 1, and thus, formula (5) encompasses phosphazene species of the following chemical formula:

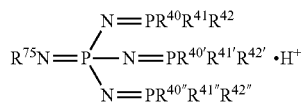
(5a)

In formula (5a) above, $R^{40}$, $R^{41}$, $R^{42}$, $R^{40'}$, $R^{41'}$, $R^{42'}$, $R^{40''}$, $R^{41''}$, $R^{42''}$, and $R^{75}$ retain their meanings as given under formula (5). All exemplary embodiments given above for these groups are also incorporated herein.

In another particular embodiment of formula (3), t is 0, and thus, formula (3) encompasses phosphazene species of the following chemical formula:

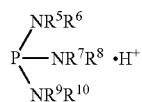
(6)

In formula (6), $R^5$, $R^6$, $R^7$, $R^8$, $R^9$, and $R^{10}$ are as defined under formula (3), i.e., independently selected from a hydrogen atom and any of the substituted or unsubstituted hydrocarbon groups described above. In particular embodiments, at least one, two, three, four, five, or all of $R^5$, $R^6$, $R^7$, $R^8$, $R^9$, and $R^{10}$ are independently selected from hydrocarbon groups, and particularly, hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups).

Optionally, two or more of $R^5$, $R^6$, $R^7$, $R^8$, $R^9$, and $R^{10}$ of formula (6) are interconnected. In one embodiment, $R^5$ and $R^6$, or $R^7$ and $R^8$, or $R^9$ and $R^{10}$, are interconnected to form a nitrogen-containing ring. In another embodiment, one or both of $R^5$ and $R^6$ are interconnected with one or two of $R^7$, $R^8$, $R^9$, and $R^{10}$. For example, $R^5$ can be connected with $R^7$ to form the following structure:

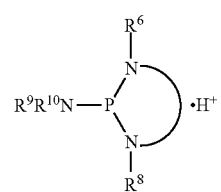
(6a)

In formula (6a), the curve represents an interconnection between $R^5$ and $R^7$. The interconnection can be, for example, any of the unsubstituted or substituted hydrocarbon linkers described above. In particular embodiments, the interconnection is a dimethylene, trimethylene, or tetramethylene linker, optionally substituted by one, two or more nitrogen or oxygen atoms. $R^6$ can additionally be linked to $R^9$, or alternatively, to $R^8$, to form, respectively, the following structures (wherein each curve can be independently selected from linker groups described above):

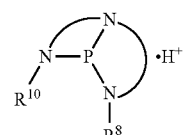
(6b)

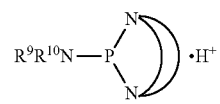
(6c)

In a particular embodiment of formula (6), $R^6$, $R^8$, and $R^{10}$ are interconnected according to the following formula:

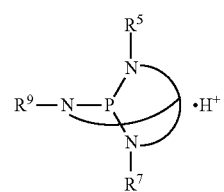
(6d)

In formula (6d), the curves represent linkers that connect to each other by a covalent bond (i.e., at a connection point). The connection point can include any suitable linking atom (e.g., carbon atom, oxygen atom, or nitrogen atom), or a heteroatom linking group (e.g., amide, carbonyl, urea, ethylene glycolate), or a linking ring group (e.g., 1,3,5-phenylene or 1,3,5-cyclohexylene). In a first set of embodiments of formula (6d), $R^5$, $R^7$, and $R^9$ are not interconnected. In another set of embodiments of formula (6d), one, two, or all of $R^5$, $R^7$, and $R^9$ are interconnected to a portion of one or more of the linkers.

In a further embodiment of formula (6d), the linkers are attached to each other via an intermediate nitrogen atom (i.e., a nitrogen atom functions as a connection point), as depicted in the following chemical formula:

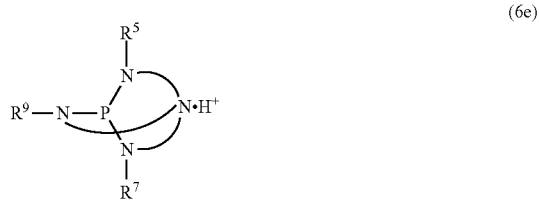

(6e)

Formula (6e) encompasses the compounds known as azaphosphatranes. The synthesis of several of these types of compounds is detailed in J. G. Verkade and P. B. Kisanga, *Aldrichimica Acta*, vol. 37, no. 1 (2004), the disclosure of which is incorporated herein by reference in its entirety. In the azaphosphatranes, the hydrogen ion is typically attached to the phosphorus atom.

In a particular embodiment of formula (6e), each of the linkers is an ethylene linker. The resulting structure can be conveniently depicted by the following chemical formula:

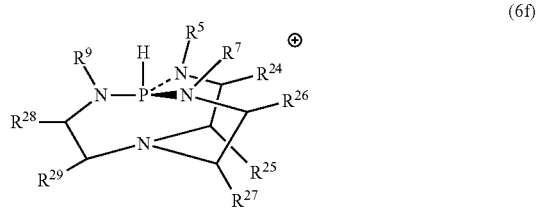

(6f)

In formula (6f), $R^5$, $R^7$, $R^9$, $R^{24}$, $R^{25}$, $R^{26}$, $R^{27}$, $R^{28}$, and $R^{29}$ are each independently selected from a hydrogen atom and any of the substituted or unsubstituted hydrocarbon groups described above. In particular embodiments, the hydrocarbon groups independently contain at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In one embodiment, $R^{24}$, $R^{25}$, $R^{26}$, $R^{27}$, $R^{28}$, and $R^{29}$ are all hydrogen atoms. In other embodiments, one, two, three, four, or five, of $R^{24}$, $R^{25}$, $R^{26}$, $R^{27}$, $R^{28}$, and $R^{29}$ are hydrocarbon groups and the remainder are hydrogen atoms. In another embodiment, $R^{24}$, $R^{25}$, $R^{26}$, $R^{27}$, $R^{28}$, and $R^{29}$ are all hydrocarbon groups. In further embodiments, one, two, or all of $R^{24}$, $R^{26}$, and $R^{28}$ are hydrocarbon groups while one, two, or all of $R^{25}$, $R^{27}$, and $R^{29}$ are hydrogen atoms. In still other embodiments, one, two, or all of $R^{24}$, $R^{26}$, and $R^{28}$ are hydrogen atoms while one, two, or all of $R^{25}$, $R^{27}$, and $R^{29}$ are hydrocarbon groups.

In one embodiment, $R^5$, $R^7$, and $R^9$ in formula (6f) are not interconnected. In other embodiments, $R^5$ is interconnected with $R^{24}$, and/or $R^7$ is interconnected with $R^{26}$, and/or $R^9$ is interconnected with $R^{28}$. The linking group resulting from interconnection between $R^5$ and $R^{24}$, and/or between $R^7$ and $R^{26}$, and/or between $R^9$ and $R^{28}$, can be any of the linking groups described above. Typically, these linking groups are dimethylene, trimethylene, or tetramethylene linkers.

In particular embodiments of formula (6), at least one of the shown amino groups (i.e., one, two, or all of —$NR^5R^6$, —$NR^7R^8$, and —$NR^9R^{10}$) is independently selected from imino groups of formula (1a) and/or phosphazeno groups of formulas (1b), (1c), (1d), and/or (1e).

In the particular case when all of the shown amino groups of formula (6) are imino groups of formula (3), formula (6) encompasses phosphazene species of the following chemical formula:

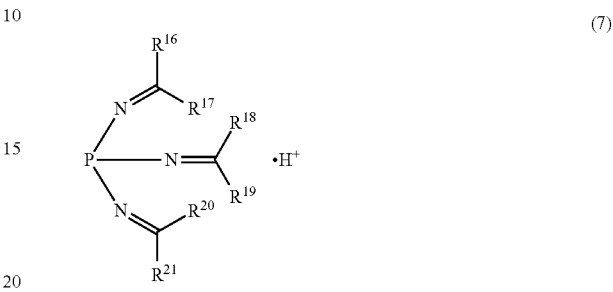

(7)

In formula (7) above, $R^{16}$, $R^{17}$, $R^{18}$, $R^{19}$, $R^{20}$, and $R^{21}$ are as defined in formula (4), i.e., each independently selected from a hydrogen atom, and/or substituted or unsubstituted hydrocarbon groups, and/or amino groups according to formula (1), and/or imino groups according to formula (1a), and/or phosphazeno groups according to formulas (1b), (1c), (1d), and/or (1e), all as described above. Optionally, two or more of $R^{16}$, $R^{17}$, $R^{18}$, $R^{19}$, $R^{20}$, and $R^{21}$ are interconnected, as described under formula (4). In particular embodiments of formula (7), at least one, two, three, four, five, or all of $R^{16}$, $R^{17}$, $R^{18}$, $R^{19}$, $R^{20}$, and $R^{21}$ are independently selected from hydrocarbon groups, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In other embodiments of formula (7), at least one of $R^{16}$, $R^{17}$, $R^{18}$, $R^{19}$, $R^{20}$, and $R^{21}$ (i.e., one, two, three, four, five, or all of $R^{16}$, $R^{17}$, $R^{18}$, $R^{19}$, $R^{20}$, and $R^{21}$) is selected from amino groups according to formula (1) and/or imino groups according to formula (1a) and/or phosphazeno groups according to formulas (1b), (1c), (1d), and/or (1e).

In the particular case when all of the shown amino groups of formula (6) are phosphazeno groups selected from formulas (1b), (1c), (1d), and/or (1e), formula (6) encompasses phosphazene species of the following chemical formula:

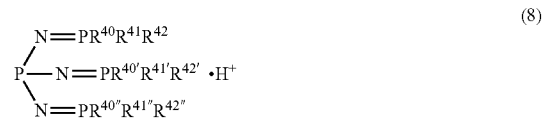

(8)

In formula (8), $R^{40}$, $R^{41}$, $R^{42}$, $R^{40'}$, $R^{41'}$, $R^{42'}$, $R^{40''}$, $R^{41''}$, and $R^{42''}$ are as defined under formula (5), i.e., independently selected from unsubstituted or heteroatom-substituted hydrocarbon groups, and/or amino groups according to formula (1), and/or imino groups according to formula (1a), and/or phosphazeno groups according to formulas (1b), (1c), (1d), and/or (1e). In a first set of embodiments, at least one (i.e., one, two, three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from hydrocarbon groups. In a second set of embodiments, at least one (i.e., one, two, three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from amino groups according to formula (1). In a third set of embodiments, at least one (i.e., one two three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from imino groups according to formula (1a). In a fourth set of embodiments, at least one (i.e., one, two, three, four, five, six, seven, eight, or all) of $R^{40}$, $R^{41}$, $R^{42}$, $R^{40'}$, $R^{41'}$, $R^{42'}$, $R^{40''}$, $R^{41''}$, and $R^{42''}$ is selected from phosphazeno groups according to formulas (1b), (1c), (1d), and/or (1e). In addition, any two or more of $R^{40}$, $R^{41}$, $R^{42}$, $R^{40'}$, $R^{41'}$, $R^{42'}$, $R^{40''}$, $R^{41''}$, and $R^{42''}$ may be interconnected. For example, two or three of $R^{40}$, $R^{41}$, and $R^{42}$, and/or two or three of $R^{40'}$, $R^{41'}$, and $R^{42'}$, and/or two or three of $R^{40''}$, $R^{41''}$, and $R^{42''}$, may be interconnected.

In further embodiments of formulas (2) and (2a), the group $R^4$ is a phosphorus-containing group that attaches to the nitrogen atom shown in formula (2) or (2a) by a phosphorus atom of the phosphorus-containing group. The phosphorus atom in the phosphorus-containing group can be, for example, any of the heteroatom-substituted hydrocarbon groups described above wherein at least one of the heteroatoms is a phosphorus atom that attaches to the nitrogen atom shown in formula (2) or (2a). The phosphorus-containing group can be, for example, an organophosphine or organophosphonium group. In a particular embodiment, $R^4$ is a phosphorus-containing group of the formula:

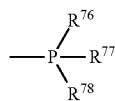

(9)

In formula (9) above, $R^{76}$, $R^{77}$, and $R^{78}$ are each independently selected from any of the unsubstituted or heteroatom-substituted hydrocarbon groups described above and bound to the shown P atom by a carbon atom; and/or amino groups of formula (1) bound to the P atom shown in formula (9) by the nitrogen atom shown in formula (1); and/or imino groups of formula (1a) bound to the P atom shown in formula (9) by the nitrogen shown in formula (1a); and/or phosphazeno groups of formulas (1b), (1c), (1d), and/or (1e) bound to the P atom shown in formula (9) by the nitrogen shown in formulas (1b), (1c), (1d), and/or (1e). In a particular embodiment, a provision is made that, when t is 0, at least one (i.e., one, two, or all) of $R^1$, $R^2$, and $R^3$ is selected from amino groups according to formula (1) and/or imino groups according to formula (1a) and/or phosphazeno groups according to formulas (1b), (1c), (1d), and/or (1e).

In one embodiment, $R^{76}$, $R^{77}$, and $R^{78}$ of formula (9) are not interconnected. In another embodiment, two of $R^{76}$, $R^{77}$, and $R^{78}$ of formula (9) are interconnected by one or more covalent chemical bonds (e.g., carbon-carbon, carbon-oxygen, and/or carbon-nitrogen bonds). When two of $R^{76}$, $R^{77}$, and $R^{78}$ are interconnected, a phosphorus-containing ring results, which includes the phosphorus atom shown in formula (9). In another embodiment, all of $R^{76}$, $R^{77}$, and $R^{78}$ of formula (9) are interconnected by covalent chemical bonds. When all of $R^{76}$, $R^{77}$, and $R^{78}$ are interconnected, a phosphorus-containing bicyclic ring system results, which includes the phosphorus atom shown in formula (9). When one or more of $R^{76}$, $R^{77}$, and $R^{78}$ are selected from amino groups, and/or imino groups, and/or phosphazeno groups (i.e., according to, respectively, formulas (1), (1a), or (1b)), an interconnection of two or three of $R^{76}$, $R^{77}$, and $R^{78}$ results, respectively, in a phosphazene-containing ring or bicyclic ring system, which includes the phosphorus atom shown in formula (9) and one or more nitrogen atoms of the one or more amino, imino, and/or phosphazeno groups.

For formula (9), one of $R^{76}$, $R^{77}$, and $R^{78}$ can be a different kind of imino group than the type shown in formula (1a), i.e., wherein one of $R^{12}$ or $R^{13}$ of formula (1) functions as an additional bond to the phosphorus atom in formula (9). Such an imino group can be depicted as follows:

(10)

In formula (10), $R^{13}$ is a hydrogen atom or any of the hydrocarbon groups described above, including unsubstituted and heteroatom-substituted hydrocarbon groups, as described under formula (1).

In particular embodiments, $R^4$ of formula (2) or (2a) is a phosphorus-containing group (specifically, a phosphazeno group) having the following formula:

(11)

In formula (11), $R^{30}$, $R^{31}$, $R^{32}$, $R^{33}$, and $R^{34}$ are independently selected from a hydrogen atom or any of the unsubstituted or heteroatom-substituted hydrocarbon groups described above, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). Optionally, two or three of $R^{30}$, $R^{31}$, $R^{32}$, $R^{33}$, and $R^{34}$ are interconnected.

When the phosphazeno group of formula (11) is included in place of $R^4$ in formula (2a), formula (2a) encompasses phosphazene species of the following chemical formula:

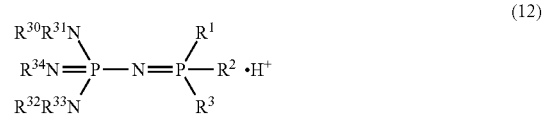

(12)

In formula (12), $R^1$, $R^2$, and $R^3$ are as defined under formula (2a), including exemplary embodiments provided therein. The groups $R^{30}$, $R^{31}$, $R^{32}$, $R^{33}$, and $R^{34}$ are as defined under formula (11).

When the phosphazeno group of formula (11) is included in place of $R^{11}$ in formula (3a), formula (3a) encompasses phosphazene species of the following chemical formula:

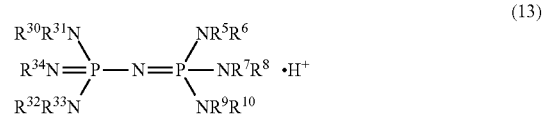

(13)

In formula (13), $R^5$, $R^6$, $R^7$, $R^8$, $R^9$, and $R^{10}$ are as defined under formula (3a), including exemplary embodiments provided therein. The groups $R^{30}$, $R^{31}$, $R^{32}$, $R^{33}$, and $R^{34}$ are as defined under formula (11). In different embodiments, the shown amino groups (i.e., one, two, three, four, or all of $—NR^5R^6$, $—NR^7R^8$, $—NR^9R^{10}$, $—NR^{30}R^{31}$, and —$NR^{32}R^{33}$) can be independently selected from amino groups according to formula (1), and/or imino groups according to formula (1a), and/or phosphazeno groups according to formulas (1b), (1c), (1d), and/or (1e). Optionally, any two or more groups selected from $R^5$, $R^6$, $R^7$, $R^8$, $R^9$, $R^{10}$, $R^{30}$, $R^{31}$, $R^{32}$, $R^{33}$, and $R^{34}$ are interconnected. For example, in different embodiments, two or more of $R^5$, $R^6$, $R^7$, $R^8$, $R^9$, and $R^{10}$ are interconnected, and/or $R^{30}$ and $R^{31}$ are interconnected, and/or $R^{32}$ and $R^{33}$ are interconnected, and/or two or more of $R^{30}$, $R^{31}$, $R^{32}$, $R^{33}$, and $R^{34}$ are interconnected.

In further embodiments of formula (13), $R^{34}$ therein can be a phosphorus-containing group as exemplified by formulas (9) and (11). In the particular embodiment when $R^{34}$ is a phosphorus-containing group according to formula (11), formula (13) encompasses phosphazene species of the following chemical formula:

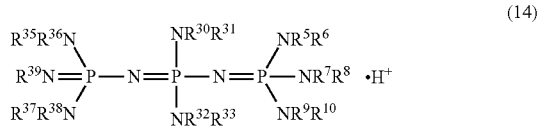

(14)

In formula (14), $R^5$, $R^6$, $R^7$, $R^8$, $R^9$, and $R^{10}$ are each independently selected from a hydrogen atom and any of the substituted or unsubstituted hydrocarbon groups, as defined under formula (3), including exemplary embodiments provided therein. The groups $R^{30}$, $R^{31}$, $R^{32}$, and $R^{33}$ are as defined under formula (11). The groups $R^{35}$, $R^{36}$, $R^{37}$, $R^{38}$, and $R^{39}$ are each independently selected from hydrogen atoms and any of the hydrocarbon groups described above, as described under formula (3), including exemplary embodiments provided therein. Optionally, any two or more groups selected from $R^5$, $R^6$, $R^7$, $R^8$, $R^9$, $R^{10}$, $R^{30}$, $R^{31}$, $R^{32}$, $R^{33}$, $R^{35}$, $R^{36}$, $R^{37}$, $R^{38}$, and $R^{39}$ are interconnected. For example, in different embodiments, two or more of $R^5$, $R^6$, $R^7$, $R^8$, $R^9$, and $R^{10}$ are interconnected, and/or $R^{30}$ and $R^{31}$ are interconnected, and/or $R^{32}$ and $R^{33}$ are interconnected, and/or two or more of $R^{35}$, $R^{36}$, $R^{37}$, $R^{38}$, and $R^{39}$ are interconnected. In different embodiments, the shown amino groups (i.e., one, two, three, four, or all of $-NR^5R^6$, $-NR^7R^8$, $-NR^9R^{10}$, $-NR^{30}R^{31}$, $-NR^{32}R^{33}$, $-NR^{35}R^{36}$, and $-NR^{37}R^{38}$) can be independently selected from amino groups according to formula (1), and/or imino groups according to formulas (1a), and/or phosphazeno groups according to formulas (1b), (1c), (1d), and/or (1e). The phosphazene species of formula (14) can represent further extended phosphazene species by making $R^{39}$ a phosphorus-containing group (as exemplified by formula (9) and (11)), in the manner described above for $R^4$ in formula (2a). The resulting phosphazene species can be further extended any number of times in similar fashion such that the number of $-N=P-$ backbone repeating units can number 5, 6, 7, 8, 9, or 10, or higher.

In another embodiment, BH$^+$ has a guanidinium composition within the following generic formula:

(15)

In formula (15), $R^{50}$, $R^{51}$, $R^{52}$, $R^{53}$, and $R^{54}$ are independently selected from a hydrogen atom or any of the unsubstituted or heteroatom-substituted hydrocarbon groups described above, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In a particular embodiment, $R^{50}$, $R^{51}$, $R^{52}$, $R^{53}$, and $R^{54}$ are all hydrogen atoms. In other embodiments, a provision is made that $R^{50}$, $R^{51}$, $R^{52}$, $R^{53}$, and $R^{54}$ cannot all be hydrogen atoms (or that at least one of $R^{50}$, $R^{51}$, $R^{52}$, $R^{53}$, and $R^{54}$ is a hydrocarbon group). In a particular set of embodiments, $R^{54}$ is a hydrogen atom while one, two, three, or all of $R^{50}$, $R^{51}$, $R^{52}$, and $R^{53}$ are hydrocarbon groups, and particularly, methyl, ethyl, n-propyl, and/or isopropyl groups. In other embodiments, a provision is made that $R^{54}$ is not a hydrogen atom (or that $R^{54}$ is a hydrocarbon group). In other embodiments, a provision is made that if $R^{54}$ is a hydrogen atom, then $R^{50}$, $R^{51}$, $R^{52}$, and $R^{53}$ cannot all be methyl groups (or alternatively, if $R^{50}$, $R^{51}$, $R^{52}$, and $R^{53}$ are all methyl groups, then $R^{54}$ is not a hydrogen atom). In another particular set of embodiments, $R^{50}$, $R^{51}$, $R^{52}$, $R^{53}$, and $R^{54}$ are all hydrocarbon groups, and particularly, methyl, ethyl, n-propyl, and/or isopropyl groups. Optionally, two or more of $R^{50}$, $R^{51}$, $R^{52}$, $R^{53}$, and $R^{54}$ are interconnected, thereby resulting in a cyclic or polycyclic (e.g., bicyclic, tricyclic, or higher cyclic) guanidinium species. The hydrogen ion depicted in formula (15) by the symbol .H$^+$ is typically attached to one or more of the nitrogen atoms of the chemical structure, and more typically, to the nitrogen atom attached to $R^{54}$.

In particular embodiments of formula (15), $R^{50}$ and $R^{52}$ are interconnected. The resulting cyclic guanidinium species are encompassed by the following chemical formula:

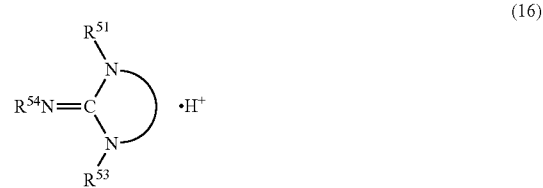

(16)

In formula (16), $R^{51}$, $R^{53}$, and $R^{54}$ are as defined under formula (15), including exemplary embodiments provided therein. The curve shown in formula (16) represents a linking group that interconnects the two shown nitrogen atoms. The linking group includes any of the unsubstituted or heteroatom-substituted hydrocarbon linking groups described above, and particularly, those containing 2, 3, or 4 carbon atoms (particularly, ethylene, trimethylene and tetramethylene linkers). In a particular embodiment, $R^{51}$, $R^{53}$, and $R^{54}$ are all hydrogen atoms. In other embodiments, a provision is made that $R^{51}$, $R^{53}$, and $R^{54}$ cannot all be hydrogen atoms (or that at least one of $R^{51}$, $R^{53}$, and $R^{54}$ is a hydrocarbon group). In a particular set of embodiments, $R^{54}$ is a hydrogen atom while one or both of $R^{51}$ and $R^{53}$ are hydrocarbon groups, and particularly, methyl, ethyl, n-propyl, and/or isopropyl groups. In other embodiments, a provision is made that $R^{54}$ is not a hydrogen atom (or that $R^{54}$ is a hydrocarbon group). In other embodiments, a provision is made that if $R^{54}$ is a hydrogen atom, then $R^{51}$ and $R^{53}$ cannot both be methyl groups. In another particular set of embodiments, $R^{51}$, $R^{53}$, and $R^{54}$ are all hydrocarbon groups, and particularly, methyl, ethyl, n-propyl, and/or isopropyl groups.

In particular embodiments of formula (16), the linker is a trimethylene linker, thereby resulting in cyclic guanidinium species encompassed by the following chemical formula:

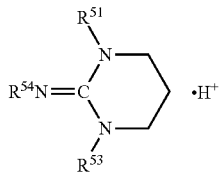

(16a)

In formula (16a), $R^{51}$, $R^{53}$, and $R^{54}$ are as defined under formulas (15) and (16), including exemplary embodiments provided therein.

In separate particular embodiments of formula (15), $R^{50}$ and $R^{54}$ are interconnected. The resulting cyclic guanidinium species are encompassed by the following chemical formula:

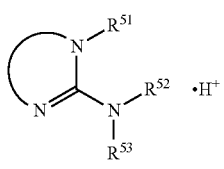

(17)

In formula (17), $R^{51}$, $R^{52}$, and $R^{53}$ are as defined under formula (15), including exemplary embodiments provided therein. The curve shown in formula (17) represents a linking group that interconnects the two shown nitrogen atoms. The linking group includes any of the unsubstituted or heteroatom-substituted hydrocarbon linking groups described above, and particularly, those containing 2, 3, or 4 carbon atoms (particularly, ethylene, trimethylene and tetramethylene linkers). In a particular embodiment, $R^{51}$, $R^{52}$, and $R^{53}$ are all hydrogen atoms. In other embodiments, a provision is made that $R^{51}$, $R^{52}$, and $R^{53}$ cannot all be hydrogen atoms (or that one, two, or all of $R^{51}$, $R^{52}$, and $R^{53}$ are hydrocarbon groups). In another particular set of embodiments, $R^{51}$, $R^{52}$, and $R^{53}$ are all hydrocarbon groups, and particularly, methyl, ethyl, n-propyl, and/or isopropyl groups.

In particular embodiments of formula (17), the linker is a trimethylene linker, thereby resulting in cyclic guanidinium species encompassed by the following chemical formula:

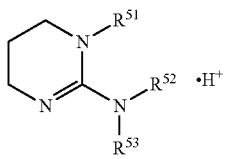

(17a)

In formula (17a), $R^{51}$, $R^{52}$, and $R^{53}$ are as defined under formula (15), including exemplary embodiments provided therein.

In a further embodiment of formula (17a), $R^{51}$ and $R^{52}$ are additionally interconnected. The resulting bicyclic guanidinium species are encompassed by the following chemical formula:

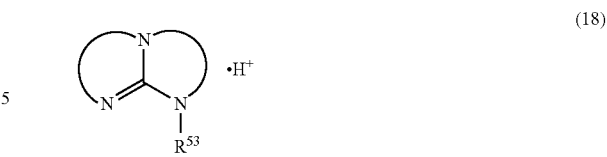

(18)

In formula (18), $R^{53}$ is a hydrogen atom or hydrocarbon group, as defined under formula (15) above, including exemplary embodiments therein. The curves shown in formula (18) represent linking groups that interconnect the shown nitrogen atoms. The linking groups can independently be any of the unsubstituted or heteroatom-substituted hydrocarbon linking groups described above, and particularly, those containing 2, 3, or 4 carbon atoms (particularly, ethylene, trimethylene and tetramethylene linkers). In particular embodiments of formula (18), at least one of the two linkers is a trimethylene linker.

In particular embodiments of formula (18), both linkers are trimethylene linkers, thereby resulting in cyclic guanidinium species encompassed by the following chemical formula:

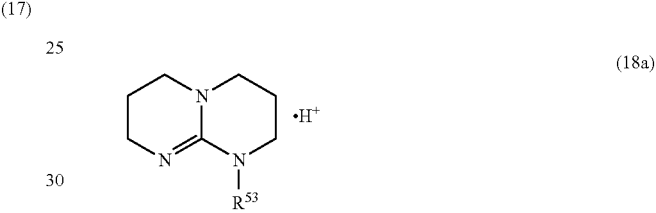

(18a)

In formula (18a), $R^{53}$ is a hydrogen atom or hydrocarbon group, as defined under formula (15) above, including exemplary embodiments therein.

In other particular embodiments of formula (15), one or both of the shown amino groups (i.e., one or both of —$NR^{50}R^{51}$ and —$NR^{52}R^{53}$) independently represent an imino group of formula (1a). In a particular set of embodiments, both aforesaid amino groups are imino groups, and the resulting guanidinium species are encompassed by the following formula:

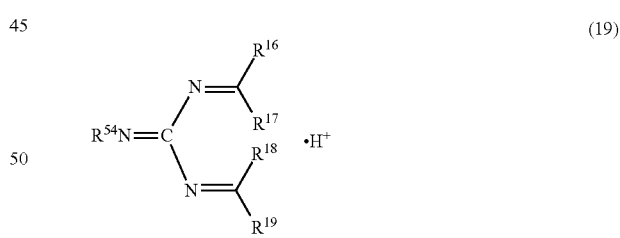

(19)

In formula (19) above, $R^{16}$, $R^{17}$, $R^{18}$, and $R^{19}$ are as defined under formula (4), i.e., independently selected from a hydrogen atom, and/or substituted or unsubstituted hydrocarbon groups (including phosphorus-containing groups of formulas (9) and (11)), and/or amino groups of formula (1), and/or imino groups of formula (1a), and/or phosphazeno groups of formulas (1b), (1c), (1d), and/or (1e), as described above. All exemplary embodiments given under formula (4) for $R^{16}$, $R^{17}$, $R^{18}$, and $R^{19}$ are applicable herein. The group $R^{54}$ is as defined under formula (15), i.e., selected from a hydrogen atom or any of the unsubstituted or heteroatom-substituted hydrocarbon groups described above. Optionally, two or more of $R^{16}$, $R^{17}$, $R^{18}$, $R^{19}$, and $R^{54}$ are interconnected as described above. For any interconnection that occurs under formula (19), any one or more of the groups $R^{16}$, $R^{17}$, $R^{18}$, $R^{19}$, and $R^{54}$ can be a linking bond (i.e., instead of a group) that links with a group, thereby allowing the resulting linker to contain as few as one carbon atom (e.g., —$CH_2$—, or =CH—) or a heteroatom (e.g., —O—, or —N=).

In a particular set of embodiments of formula (19), each of the groups $R^{16}$, $R^{17}$, $R^{18}$, and $R^{19}$ are amino groups according to formula (1). The resulting guanidinium species are encompassed by the following chemical formula:

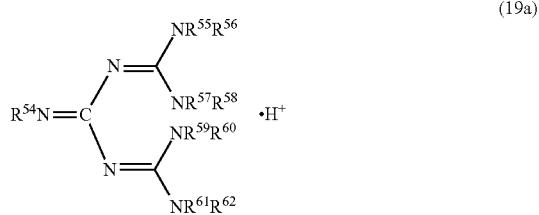

(19a)

In formula (19a), $R^{54}$, $R^{55}$, $R^{56}$, $R^{57}$, $R^{58}$, $R^{59}$, $R^{60}$, $R^{61}$, and $R^{62}$ are each independently selected from a hydrogen atom or any of the unsubstituted or heteroatom-substituted hydrocarbon groups described above, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In a particular embodiment $R^{54}$, $R^{55}$, $R^{56}$, $R^{57}$, $R^{58}$, $R^{59}$, $R^{60}$, $R^{61}$, and $R^{62}$ are all hydrogen atoms. In other embodiments, a provision is made that $R^{54}$, $R^{55}$, $R^{56}$, $R^{57}$, $R^{58}$, $R^{59}$, $R^{60}$, $R^{61}$, and $R^{62}$ cannot all be hydrogen atoms (or that at least one of $R^{54}$, $R^{55}$, $R^{56}$, $R^{57}$, $R^{58}$, $R^{59}$, $R^{60}$, $R^{61}$, and $R^{62}$ is a hydrocarbon group). In a particular set of embodiments, $R^{54}$ is a hydrogen atom while one, two, three, four, five, six, seven, or all of $R^{55}$, $R^{56}$, $R^{57}$, $R^{58}$, $R^{59}$, $R^{60}$, $R^{61}$, and $R^{62}$ are hydrocarbon groups, and particularly, independently selected from methyl, ethyl, n-propyl, and/or isopropyl groups. In other embodiments, a provision is made that $R^{54}$ is not a hydrogen atom (or that $R^{54}$ is a hydrocarbon group). In another particular set of embodiments, $R^{54}$, $R^{55}$, $R^{56}$, $R^{57}$, $R^{58}$, $R^{59}$, $R^{60}$, $R^{61}$, and $R^{62}$ are all hydrocarbon groups, and particularly, methyl, ethyl, n-propyl, and/or isopropyl groups. Optionally, two or more of $R^{54}$, $R^{55}$, $R^{56}$, $R^{57}$, $R^{58}$, $R^{59}$, $R^{60}$, $R^{61}$, and $R^{62}$ are interconnected, thereby resulting in a cyclic or polycyclic (e.g., bicyclic, tricyclic, or higher cyclic) guanidinium species. For any interconnection that occurs under formula (19a), any one or more of the groups $R^{54}$, $R^{55}$, $R^{56}$, $R^{57}$, $R^{58}$, $R^{59}$, $R^{60}$, $R^{61}$, and $R^{62}$ can be a linking bond (i.e., instead of a group) that links with a group, as described above under formula (19).

Any one two three or all of the above amino groups —$NR^{55}R^{56}$, —$NR^{57}R^{58}$, —$NR^{59}R^{60}$, and —$NR^{61}R^{62}$ of formula (19a) can also be imino groups according to formula (1a). Any one, two, three or all of the above amino groups —$NR^{55}R^{56}$, —$NR^{57}R^{58}$, —$NR^{59}R^{60}$, and —$NR^{61}R^{62}$ can also be phosphazeno groups selected from formulas (1b), (1c), (1d), and/or (1e).

In other particular embodiments of formula (15), one or both of the shown amino groups (i.e., one or both of —$NR^{50}R^{51}$ and —$NR^{52}R^{53}$) independently represent a phosphazeno group selected from formulas (1b), (1c), (1d), and/or (1e). In a particular set of embodiments, both aforesaid amino groups are phosphazeno groups, and the resulting guanidinium species are encompassed by the following formula:

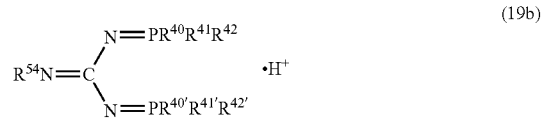

(19b)

In formula (19b) above, $R^{40}$, $R^{41}$, $R^{42}$, $R^{40'}$, $R^{41'}$, and $R^{42'}$ it are as defined under formula (8), i.e., independently selected from unsubstituted or heteroatom-substituted hydrocarbon groups, and/or amino groups according to formula (1), and/or imino groups according to formula (1a), and/or phosphazeno groups according to formulas (1b), (1c), (1d), and/or (1e). All exemplary embodiments given under formula (8) for $R^{40}$, $R^{41}$, $R^{42}$, $R^{40'}$, $R^{41'}$, and $R^{42'}$ are applicable herein. The group $R^{54}$ is as defined under formula (15). Optionally, two or more of $R^{40}$, $R^{41}$, $R^{42}$, $R^{40'}$, $R^{41'}$, $R^{42'}$, and $R^{54}$ are interconnected as described above. For any interconnection that occurs under formula (19b), any one or more of the groups $R^{40}$, $R^{41}$, $R^{42}$, $R^{40'}$, $R^{41'}$, $R^{42'}$, and $R^{54}$ can be a linking bond (i.e., instead of a group) that links with a group, as described above under formula (19).

In a particular set of embodiments of formula (19b), each of the groups $R^{40}$, $R^{41}$, $R^{42}$, $R^{40'}$, $R^{41'}$, and $R^{42'}$ are amino groups according to formula (1). The resulting guanidinium species are encompassed by the following chemical formula:

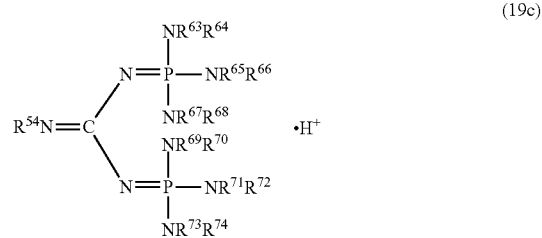

(19c)

In formula (19c), $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are independently selected from a hydrogen atom or any of the unsubstituted or heteroatom-substituted hydrocarbon groups described above, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In a particular embodiment, $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are all hydrogen atoms. In other embodiments, a provision is made that $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are not all hydrogen atoms (or that at least one of $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ is a hydrocarbon group). In a particular set of embodiments, $R^{54}$ is a hydrogen atom while one, two, three, four, five, six, seven, eight, nine, ten, eleven, or all of $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are hydrocarbon groups, and particularly, methyl, ethyl, n-propyl, and/or isopropyl groups. In other embodiments, a provision is made that $R^{54}$ is not a hydrogen atom (or that $R^{54}$ is a hydrocarbon group). In another particular set of embodiments, $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are all hydrocarbon groups, and particularly, methyl, ethyl, n-propyl, and/ or isopropyl groups. Optionally, two or more of $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are interconnected, thereby resulting in a cyclic or polycyclic (e.g., bicyclic, tricyclic, or higher cyclic) guanidinium species. For any interconnection that occurs under formula (19c), any one or more of the groups $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ can be a linking bond (i.e., instead of a group) that links with a group, as described above under formula (19).

Any one, two, three, four, five, or all of the above amino groups —$NR^{63}R^{64}$, —$NR^{65}R^{66}$, —$NR^{67}R^{68}$, —$NR^{69}R^{70}$, —$NR^{71}R^{72}$, and —$NR^{73}R^{74}$ of formula (19c) can also be imino groups according to formula (1a). Any one, two, three or all of the above amino groups —$NR^{63}R^{64}$, —$NR^{65}R^{66}$, —$NR^{67}R^{68}$, —$NR^{69}R^{70}$, —$NR^{71}R^{72}$, and —$NR^{73}R^{74}$ can also be phosphazeno groups selected from formulas (1b), (1c), (1d), and/or (1e).

For the guanidinium species encompassed under formula (15), and subformulas more limited in scope, group $R^{54}$ can also be a phosphorus-containing group, such as exemplified by formulas (9) and (11). When the phosphazeno group of formula (11) is included in place of $R^{54}$ in formula (15), formula (15) encompasses guanidinium-phosphazene species of the following chemical formula:

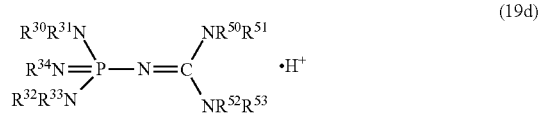

(19d)

In formula (19d), $R^{50}$, $R^{51}$, $R^{52}$, and $R^{53}$ are independently selected from a hydrogen atom or any of the unsubstituted or heteroatom-substituted hydrocarbon groups, as described above under formula (15), including exemplary embodiments provided therein. The groups $R^{30}$, $R^{31}$, $R^{32}$, $R^{33}$, and $R^{34}$ are as defined under formula (11). The group $R^{34}$ can also be a phosphazeno group according to formulas (9) or (11).

Any one, two, three, or all of the above amino groups —$NR^{50}R^{51}$, —$NR^{52}R^{53}$, —$NR^{30}R^{31}$, and —$NR^{32}R^{33}$ in formula (19d) can also be imino groups according to formula (1a). Any one, two, three or all of the above amino groups —$NR^{50}R^{51}$, —$NR^{52}R^{53}$, —$NR^{30}R^{31}$, and —$NR^{32}R^{33}$ in formula (19d) can also be phosphazeno groups selected from formulas (1b), (1c), (1d), and/or (1e).

Optionally, two or more of $R^{30}$, $R^{31}$, $R^{32}$, $R^{33}$, $R^{34}$, $R^{50}$, $R^{51}$, $R^{52}$, and $R^{53}$ are interconnected, thereby resulting in a cyclic or polycyclic (e.g., bicyclic, tricyclic, or higher cyclic) guanidinium species. For any interconnection that occurs under formula (19d), any one or more of the groups $R^{30}$, $R^{31}$, $R^{32}$, $R^{33}$, $R^{34}$, $R^{50}$, $R^{51}$, $R^{52}$, and $R^{53}$, can be a linking bond (i.e., instead of a group) that links with a group, as described above under formula (19).

The conjugate base portion of the protic ionic liquid (i.e., species $A^-$) is any counteranion which, when associated with the cationic component $BH^+$, permits the resulting ionic compound to behave as an ionic liquid. As known in the art, the composition and structure of the counteranion can have a significant effect on the properties (e.g., melting point, volatility, stability, viscosity, hydrophobicity, and so on) of the ionic liquid.

In one embodiment, the species $A^-$ of the ionic liquid is derived from an acid HA. The acid HA can have any pKa value. In different embodiments, the corresponding species $A^-$ can be inorganic or organic, contain fluorine atoms or lack fluorine atoms, and be either symmetrical or asymmetrical in structure. Some examples of common anionic species considered herein for $A^-$ include, for example, the halides (e.g., fluoride, chloride, bromide, and iodide), carbonate, bicarbonate, the carboxylates (e.g., formate, acetate, propionate, butyrate, valerate, lactate, pyruvate, oxalate, malonate, glutarate, adipate, decanoate, and fluorocarboxylates, e.g., trifluoroacetate), hexafluorophosphate ($PF_6^-$), hexachlorophosphate ($PCl_6^-$), perchlorate, chlorate, chlorite, perbromate, bromate, bromite, periodiate, iodate, dicyanamide (i.e., $N(CN)_2^-$), the alkoxides (e.g., methoxide, ethoxide, isopropoxide, phenoxide, and fluoroalkoxides, e.g., $CF_3O^-$), the amides (e.g., dimethylamide and diisopropylamide), diketonates (e.g., acetylacetonate), aluminum chlorides (e.g., $Al_2Cl_7^-$, $AlCl_4^-$, and $AlF_4^-$), aluminum bromides (e.g., $AlBr_4^-$), nitrate, nitrite, sulfate, bisulfate, sulfite, bisulfate, the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), phosphate, hydrogenphosphate, dihydrogenphosphate, pyrophosphate, phosphite, arsenate, hydrogenarsenate, dihydrogenarsenate, selenate, tellurate, tungstate, molybdate, chromate, silicate, the borates (e.g., borate, diborate, triborate, tetraborate, and tetrafluoroborate), anionic borane, carborane clusters (e.g., $B_{10}H_{10}^{2-}$ and $B_{12}H_{12}^{2-}$), perrhenate, permanganate, ruthenate, perruthenate, and the polyoxometallates.

Organic derivatives of any inorganic species described above are also contemplated for $A^-$. Some examples of these types of species include the organoborates (e.g., $BR_1R_2R_3R_4^-$, wherein $R_1$, $R_2$, $R_3$, $R_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate).

In a particular embodiment, the species $A^-$ of the ionic liquid is derived from a superacid HA. As generally understood in the art, the term "superacid" as used herein is generally understood to mean an acid having an acidity greater than (or pKa less than) conventional mineral acids, and particularly, an acidity greater than (or pKa less than) pure (i.e., 100%) sulfuric acid. As 100% sulfuric acid is known to have a pKa of −3, the superacids considered herein preferably possess a pKa of less than −3. For example, in different embodiments, it may be preferred for the superacid to have a pKa of or less than about −4, −5, −6, −7, −8, −9, −10, −11, −12, −13, −14, −15, −16, −17, −18, −19, −20, −21, −22, −23, −24, or −25. In one embodiment, the superacid does not contain fluorine atoms, while in another embodiment, the superacid contains one, two, three, or more fluorine atoms. Some of the acids enumerated above may possess a pKa of less than −3, and hence, may also be superacids. Some examples of known superacids include fluorosulfonic acid ($FSO_3H$), hexafluoroantimonic acid ($HSbF_6$), hexafluoroarsenic acid ($HAsF_6$), hexafluorotantalum acid ($HTaF_6$), and hexafluoroniobium acid ($HNbF_6$). The corresponding conjugate base species $A^-$ of the foregoing superacids are, respectively, fluorosulfonate ($FSO_3^-$), hexafluoroantimonate ($SbF_6^-$), hexafluoroarsenate ($AsF_6^-$), hexafluorotantalate ($TaF_6^-$), and hexafluoroniobate ($NbF_6^-$).

In a particular set of embodiments, the species $A^-$ of the protic ionic liquid has a formula within the general chemical formula:

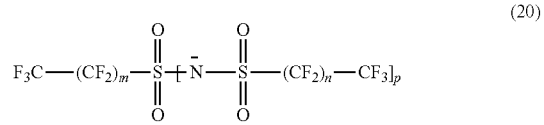

(20)

In formula (20) above, subscripts m and n are independently 0 or an integer of 1 or above. Subscript p is 0 or 1, provided that when p is 0, the group —N—SO$_2$—(CF$_2$)$_n$CF$_3$ subtended by p is replaced with an oxide atom connected to the sulfur atom (S).

In one embodiment of formula (20), subscript p is 1, and thus, formula (20) reduces to the chemical formula:

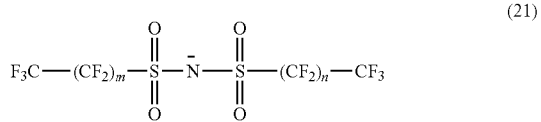

In one embodiment of formula (21), the shown perfluoroalkyl groups do not crosslink with each other, thereby resulting in a non-cyclic anion. In a further embodiment, m and n are the same number, thereby resulting in a symmetrical counteranion. In another embodiment, m and n are not the same number, thereby resulting in an asymmetrical counteranion.

In a first set of embodiments of formula (21), m and n are independently at least 0 and up to 1, 2, 3, 4, 5, 6, 7, 8, 9, 10, or 11. When m and n are both 0, the resulting anion has the formula CF$_3$SO$_2$NSO$_2$CF$_3$, i.e., bis(trifluoromethylsulfonyl) imide, or Tf$_2$N$^-$. In another embodiment, m and n are not both 0. For example, in a particular embodiment, m is 0 while n is a value of 1 or above (e.g., 1, 2, 3, 4, 5, 6, 7, 8, 9, 10, or 11). Some examples of such anions include CF$_3$SO$_2$NSO$_2$CF$_2$CF$_3$, CF$_3$SO$_2$NSO$_2$(CF$_2$)$_2$CF$_3$, CF$_3$SO$_2$NSO$_2$(CF$_2$)$_3$CF$_3$, CF$_3$SO$_2$NSO$_2$(CF$_2$)$_4$CF$_3$, CF$_3$SO$_2$NSO$_2$(CF$_2$)$_5$CF$_3$, and so on, wherein it is understood that, in the foregoing examples, the negative sign indicative of a negative charge (i.e., "-") in the anion has been omitted for the sake of clarity.

In a second set of embodiments of formula (21), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include N[SO$_2$CF$_2$CF$_3$]$_2$ (i.e., "BETI$^-$"), CF$_3$CF$_2$SO$_2$NSO$_2$(CF$_2$)$_2$CF$_3$, CF$_3$CF$_2$SO$_2$NSO$_2$(CF$_2$)$_3$CF$_3$, CF$_3$CF$_2$SO$_2$NSO$_2$(CF$_2$)$_4$CF$_3$, CF$_3$CF$_2$SO$_2$NSO$_2$(CF$_2$)$_5$CF$_3$, and so on.

In a third set of embodiments of formula (21), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include N[SO$_2$(CF$_2$)$_2$CF$_3$]$_2$, CF$_3$(CF$_2$)$_2$SO$_2$NSO$_2$(CF$_2$)$_3$CF$_3$, CF$_3$(CF$_2$)$_2$SO$_2$NSO$_2$(CF$_2$)$_4$CF$_3$, CF$_3$(CF$_2$)$_2$SO$_2$NSO$_2$(CF$_2$)$_5$CF, and so on.

In a fourth set of embodiments of formula (21), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include N[SO$_2$(CF$_2$)$_3$CF$_3$]$_2$, CF$_3$(CF$_2$)$_3$SO$_2$NSO$_2$(CF$_2$)$_4$CF$_3$, CF$_3$(CF$_2$)$_3$SO$_2$NSO$_2$(CF$_2$)$_5$CF$_3$, CF$_3$(CF$_2$)$_3$SO$_2$NSO$_2$(CF$_2$)$_6$CF$_3$, CF$_3$(CF$_2$)$_3$SO$_2$NSO$_2$(CF$_2$)$_7$CF$_3$, and so on.

In a fifth set of embodiments of formula (21), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include N[SO$_2$(CF$_2$)$_4$CF$_3$]$_2$, CF$_3$(CF$_2$)$_4$SO$_2$NSO$_2$(CF$_2$)$_5$CF$_3$, CF$_3$(CF$_2$)$_4$SO$_2$NSO$_2$(CF$_2$)$_6$CF$_3$, CF$_3$(CF$_2$)$_4$SO$_2$NSO$_2$(CF$_2$)$_6$CF$_3$, CF$_3$(CF$_2$)$_4$SO$_2$NSO$_2$(CF$_2$)$_8$CF$_3$, and so on.

In a sixth set of embodiments of formula (21), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include N[SO$_2$(CF$_2$)$_5$CF$_3$]$_2$, CF$_3$(CF$_2$)$_5$SO$_2$NSO$_2$(CF$_2$)$_6$CF$_3$, CF$_3$(CF$_2$)$_5$SO$_2$NSO$_2$(CF$_2$)$_7$CF$_3$, CF$_3$(CF$_2$)$_5$SO$_2$NSO$_2$(CF$_2$)$_8$, CF$_3$, CF$_3$(CF$_2$)$_5$SO$_2$NSO$_2$(CF$_2$)$_9$CF$_3$, and so on.

In a seventh set of embodiments of formula (21), m and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include N[SO$_2$(CF$_2$)$_6$CF$_3$]$_2$, CF$_3$(CF$_2$)$_6$SO$_2$NSO$_2$(CF$_2$)$_7$CF$_3$, CF$_3$(CF$_2$)$_6$SO$_2$NSO$_2$(CF$_2$)$_8$CF$_3$, CF$_3$(CF$_2$)$_6$SO$_2$NSO$_2$(CF$_2$)$_9$CF$_3$, CF$_3$(CF$_2$)$_6$SO$_2$NSO$_2$(CF$_2$)$_{10}$CF$_3$, and so on.

In an eighth set of embodiments of formula (21), m and n are independently at least 7 and up to 8, 9, 10, or 11. For example, in a particular embodiment, m is 7 while n is a value of 7 or above (e.g., 7, 8, 9, 10, or 11). Some examples of such anions include N[SO$_2$(CF$_2$)$_7$CF$_3$]$_2$, CF$_3$(CF$_2$)$_7$SO$_2$NSO$_2$(CF$_2$)$_8$CF$_3$, CF$_3$(CF$_2$)$_7$SO$_2$NSO$_2$(CF$_2$)$_9$CF$_3$, CF$_3$(CF$_2$)$_7$SO$_2$NSO$_2$(CF$_2$)$_{10}$CF$_3$, and CF$_3$(CF$_2$)$_7$SO$_2$NSO$_2$(CF$_2$)$_{11}$CF$_3$.

In other embodiments of formula (21), in abides by one or a number of alternative conditions set forth in one of the foregoing eight embodiments while n abides by one or a number of alternative conditions set forth in another of the foregoing eight embodiments.

In yet another embodiment of formula (21), the two fluoroalkyl chains shown therein are crosslinked to form a cyclic anion structure (i.e., along with removal of two fluorine atoms). In a particular embodiment, the cyclic anion has a formula within the following generic formula:

In formula (22) above, subscript v preferably has a value of 0, 1, or 2, to produce, respectively, a five-membered, six-membered, or seven-membered ring. Though formula (22) is shown as an unbranched and saturated cyclic system containing difluoromethylene units, the cyclic anion can also be branched (e.g., by the presence of —CH$_3$ or CF$_3$ groups) and/or unsaturated (e.g., by the presence of a —CF=CF— group).

In another embodiment, subscript p in formula (21) is 0, so that formula (21) reduces to the chemical formula:

In different exemplary embodiments of formula (23), m can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $CF_3SO_3^-$ (i.e., "triflate" or "$TfO^-$"), $CF_3CF_2SO_3^-$, $CF_3(CF_2)_2SO_3^-$, $CF_3(CF_2)_3SO_3^-$ (i.e., "nonaflate" or "$NfO^-$"), $CF_3(CF_2)_4SO_3^-$, $CF_3(CF_2)_5SO_3^-$, $CF_3(CF_2)_6SO_3^-$, $CF_3(CF_2)_7SO_3^-$, $CF_3(CF_2)_8SO_3^-$, $CF_3(CF_2)_9SO_3^-$, $CF_3(CF_2)_{10}SO_3^-$, $CF_3(CF_2)_{11}SO_3^-$, and so on.

The protic ionic liquids described above, as well as the superbase and acid components thereof, can be synthesized by procedures well-known in the art. For example, guanidino and phosphazeno classes of superbases described above can be synthesized according to procedures described in A. A. Kolomeitsev, et al., *J. Am. Chem. Soc.*, 127, pp. 17656-17666 (2005), which is herein incorporated by reference in its entirety. The acids and superacid component (HA or $A^-$) are generally well-known in the art, and numerous of them are commercially available.

The protic ionic liquids described herein can be prepared by any suitable method, including methods known in the art. A general reference for the preparation, purification, and testing of protic ionic liquids is found in T. L. Greaves, et al., *Chem. Rev.*, 108, pp. 206-237 (2008), which is herein incorporated by reference in its entirety. In a particular embodiment, the ionic liquids described herein are prepared by direct reaction of the acid HA and the superbase B in a suitable solvent, such as a water or water-alcohol solvent. In another embodiment, particularly when HA is a superacid, the ionic liquids described herein are prepared in a two-step process wherein the superbase B is first reacted with a strong acid HA' (e.g., a mineral acid) to form the species $BH^+A'$, and then the species $BH^+A'$ is reacted with a salt of the superacid (i.e., $M^+A^-$, wherein M is a metal, such as an alkali metal) to form $BH^+A^-$ along with $M^+A'$. Typically, particularly when an aqueous phase is utilized, the ionic liquid is less soluble than the salt byproduct in water, and therefore, settles out of the solution as a separate phase, thereby making separation possible by use of, for example, a separatory funnel. Because the ionic liquid is generally more dense than the solvent, the ionic liquid tends to form a lower phase while the salt byproduct is maintained in a solvent upper phase. After the ionic liquid is initially separated, the ionic liquid can be purified by any of the means known in the art (e.g., solvent washings and/or distillation).

The protic ionic liquids of the invention are naturally in a liquid state (i.e., fluids) typically at or below 100° C., and more typically, at or below 90° C., 80° C., 70° C., 60° C., 50° C., 40° C., or at or below room temperature (i.e., at or less than about 15, 20, 25, or 30° C.). In other embodiments, the ionic liquids are in liquid form at or below 0° C., −5° C., −10° C., −20° C., or −30° C. Preferably, the ionic liquid possesses a melting point that is at or below any of the temperatures given above. Though the invention primarily contemplates ionic liquids that are naturally fluids at or below room temperature, the invention also contemplates ionic liquids that are solid or semi-solid at about room temperature or above (or at 100° C. or above), but which can be rendered liquids at a higher temperature by the application of heat. The latter embodiment may be particularly suitable if the process in which the ionic liquid is used is a high temperature process (i.e., above room temperature).

The density of the ionic liquid is generally above 1.2 g/mL at an operating temperature of interest, and particularly at a temperature within 20-30° C. In different embodiments, the density of the ionic liquid can be about, at least, or no more than, for example, 1.2, 1.3, 1.4, 1.5, 1.6, 1.7, or 1.8 g/mL, or a particular range bounded by any two of the foregoing exemplary values.

The viscosity of the ionic liquid is typically no more than about 50,000 centipoise (50,000 cP) at an operating temperature of interest, and particularly at a temperature within 20-30° C. In other embodiments, the viscosity of the ionic liquid can be about, at least, or no more than, for example, 25,000 cP, 10,000 cP, 5,000 cP, 2,000 cP, 1,000 cP, 800 cP, 700 cP, 600 cP, 500 cP, 400 cP, 300 cP, 200 cP, 120 cP, 100 cP, or 50 cP. Alternatively, the viscosity of the ionic liquid may preferably be within a particular range bounded by any two of the foregoing exemplary values.

The conductivity of the ionic liquid is typically at least 0.01 mS/cm (0.001 S/m) at an operating temperature of interest, and particularly at a temperature within 20-30° C. In different embodiments, the conductivity of the ionic liquid can be about, at least, or no more than, for example, 0.01, 0.05, 0.1, 0.2, 0.3, 0.4, 0.5, 1.0, 2.0, 3.0, 4.0, 5.0, 6.0, 7.0, 8.0, 9.0, 10.0, 11.0. or 12.0 mS/cm, or a particular range bounded by any two of the foregoing exemplary values.

The superbase-derived ionic liquids described herein can also be combined with each other and/or with one or more conventional ionic liquids, i.e., ionic liquids that are not superbase-derived. The conventional ionic liquid can be, for example, any of the imidazolium-based ionic liquids known in the art (e.g., 1-butyl-3-methylimidazolium (BMIM) ionic liquids, such as [BMIM][$Tf_2N$]), and/or any of the N-alkylpyridinium-based ionic liquids known in the art, and/or any of the ammonium-based ionic liquids known in the art (e.g., [$Et_3NH$][$Tf_2N$], where Et indicates ethyl), and/or any of the phosphonium-based ionic liquids known in the art, and/or piperidinium-based ionic liquids known in the art, and/or pyrrolidinium-based ionic liquids known in the art, and/or sulfonium-based ionic liquids known in the art. In particular embodiments, admixture of one or more of the above-described superbase-derived ionic liquids with another superbase-derived ionic liquid or one or more conventional ionic liquids has the beneficial effect of lowering the melting point (i.e., fusion temperature or liquidus temperature, $T_{fus}$) of the superbase-derived ionic liquid. This effect can be particularly desired for lowering the melting point of a superbase-derived ionic liquids that has a melting point above the typical upper temperature of 100° C. The inclusion of one or more conventional ionic liquids may also serve to modify, adjust, or optimize one or more other properties or characteristics of the ionic liquid, including density, viscosity, conductivity, chemical, or catalytic properties. In other embodiments, one or more particular classes or compositions of conventional ionic liquids are excluded from the ionic liquid composition, or alternatively, any ionic liquid not described herein as a superbase-derived ionic liquid is excluded.

The invention is also directed to compositions that include one or more of the above-described ionic liquids admixed with one or more solvents. The solvent can function, for example, as a casting solvent, film-forming solvent, or matrix. The solvent can be, for example, a polar protic solvent, polar aprotic solvent, or a non-polar solvent. Some examples of polar protic solvents include the alcohols containing up to four linked carbon atoms (e.g., methanol, ethanol, isopropanol, n-butanol, t-butanol), diols (e.g., ethylene glycol, diethylene glycol, triethylene glycol), and protic amines (e.g., ethylenediamine, ethanolamine, diethanolamine, triethanolamine). Some examples of polar aprotic solvents include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), HMPA, NMP, and DMPU. As used herein, a "non-polar solvent" is a solvent containing a linkage of at least five carbon atoms. Accordingly, some examples of non-polar solvents include n-pentanol, n-hexanol, a pentane, hexane, heptane, octane, pentene, hexene, heptene, octene, or an aromatic solvent, such as benzene, toluene, or a xylene. In different embodiments, the solvent can be included in an amount of, or at least, or less than, for example, 0.1 wt %, 0.5 wt %, 10 wt %, 20 wt %, 30 wt %, 40 wt %, 50 wt %, 60 wt %, 70 wt %, 80 wt %, 90 wt % (by total weight of the ionic liquid, solvent, and any other components), or within a range bounded by any of the foregoing exemplary values.

In other embodiments, one or more of any of the foregoing classes of solvents, or specific solvents, is excluded. For example, in some embodiments, it may be preferable to exclude solvents having a boiling point over 25° C., 50° C., or 100° C. In other embodiments, it may be preferable to exclude solvents having a boiling point under 25° C., 50° C., or 100° C. In yet other embodiments, it may preferable to include only one or more solvents in which the ionic liquid is substantially soluble, or partially soluble, or substantially insoluble (e.g., as separate phases). In a particular embodiment, all solvents are excluded.

In one set of embodiments, the protic ionic liquids described above contain or are admixed with a certain amount of water, e.g., about, at least, or no more than 1%, 5%, 10%, 20%, 30%, 40%, 50%, 60%, 70%, 80%, or 90% of water. In another set of embodiments, the ionic liquid is substantially devoid of water. For example, in some embodiments, it is desirable that the ionic liquid contains less than 1% by weight of water, or less than 0.5%, 0.1%, 0.01%, or even less than 0.001% by weight of water.

In another aspect, the invention is directed to applying the above-described protic ionic liquids as an ionic liquid-containing films useful, for example, as proton exchange membrane materials or separation materials (i.e., that are permeable or impermeable to a gas and/or a liquid, such as in an industrial process). In a particular embodiment, the film or membrane is composed of solely one or more of the above-described ionic liquids.

In another embodiment, the film or membrane includes one or more of the above-described ionic liquids in combination with a support or matrix material. Depending on the desired application, the support or matrix material can be an inert (i.e., non-reactive) material, or alternatively, a chemically reactive or physically active material. The support or matrix material can have any suitable characteristics, such as being flexible or rigid, malleable or non-malleable, and porous or non-porous. A class of support materials particularly considered herein are solid polymers, and particularly, those polymers suitable for use as a membrane material in proton exchange membrane or polymer electrolyte membrane (PEM) fuel cells. A particular class of polymer support materials considered herein are the fluoropolymers, such as polyvinylidene fluoride (PVDF), polytetrafluoroethylene (PTFE), perfluoroalkoxy polymer resin (PFA), polyvinylfluoride (PVF), sulfonated forms thereof, and copolymers thereof. Some examples of fluoropolymer-containing copolymers include poly(vinylidenefluoride-co-hexafluoropropylene), Nafion, fluorinated ethylene-propylene, and poly(ethylene-co-tetrafluoroethylene) (PTFE).

In one embodiment, the ionic liquid is integrated within the support or matrix material. The ionic liquid can be integrated into the support or matrix material by either being homogeneously incorporated therein, or alternatively, impregnated or infused into porous spaces of a support material. In another embodiment, the ionic liquid is a layer on a support material. In another embodiment, the ionic liquid is a layer sandwiched between layers of support material.

The film or membrane containing the ionic liquid can have any suitable thickness. For example, in different embodiments, the film or membrane can have a thickness of about, at least, or no more than 1, 2, 3, 4, 5, 10, 20, 30, 40, 50, 60, 70, 80, 90, 100, 120, 140, 160, 180, or 200 microns, or a thickness within a range bounded by any two of the foregoing values.

The ionic liquid and polymer matrix can be combined in any suitable weight ratio. For example, in different embodiments, the weight ratio of ionic liquid to polymer matrix is preferably about 5:95, 10:90, 20:80, 30:70, 40:60, 50:50, 60:40, 70:30, 80:20, 90:10, or 95:5, or within a range bounded by any two of the foregoing values.

A film or membrane of the ionic liquid can be prepared by any of the means known in the art. For example, the film or membrane can be prepared by mixing a matrix or support material with the ionic liquid, often in combination with a casting solvent, and casting the mixture onto a desired substrate. Typically, the initially casted layer is heated to remove the casting solvent, thereby solidifying the layer. Other processes, such as crosslinking reactions, can additionally be employed to further solidify the film.

Examples have been set forth below for the purpose of illustration and to describe certain specific embodiments of the invention. However, the scope of this invention is not to be in any way limited by the examples set forth herein.

Example 1

Preparation of Protic Ionic Liquids (PILs)

Sixteen exemplary PILs were prepared by reacting superbases, as shown below, with either of two perfluoroalkylsulfonamide superacids (specifically, either $HTf_2N$ or HBETI). The eight superbases are as follows:

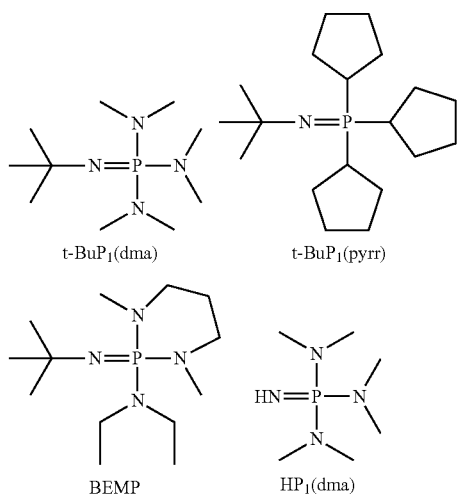

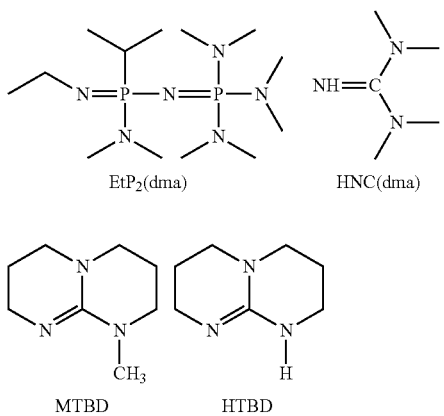

EtP₂(dma)    HNC(dma)

MTBD    HTBD

The new PILs were synthesized in high yield (>98%) via a single pot synthesis in two steps, as depicted in FIG. 1. Referring to the PIL [MTBDH][Tf₂N] for illustration, MTBD (pK$_a$ (BH⁺)=25.4) was initially dissolved in water and chilled in an ice bath, followed by careful titration with 10.6 N HNO₃ to form aqueous [MTBDH][NO₃]. Anion exchange was achieved by adding one equivalent of LiTf₂N in water, resulting in spontaneous segregation of the dense, lower [MTBDH][Tf₂N] phase. After careful washing with double distilled water several times, rotary evaporation resulted in a nearly colorless free-flowing PIL in nearly quantitative yield. In this case, following vacuum drying at 70° C. overnight, [MTBDH] [Tf₂N] contained some 110 ppm water (as determined by Karl-Fischer Coulometric titration) and showed a room temperature ionic conductivity (σ) of 1.49 mS·cm⁻¹. Some of the physical properties of three of the exemplary PILs are shown in Table 1 below.

TABLE 1

Physical properties of selected PILs[a]

| PIL | d/g cm⁻³ | η/mPa s[b] 23° C. | 40° C. | 100° C. | σ(25° C.)/ mS cm⁻¹ |
|---|---|---|---|---|---|
| [MTBDH][Tf₂N] | 1.49 | 148 | 63 | 10.4 | 1.49 |
| [MTBDH][beti] | 1.52 | 421 | 139 | 14.2 | 0.70 |
| [HNC(dma)H][beti] | 1.51 | 224 | 81.0 | 10.2 | 0.79 |

[a] d is the mass density, η is the viscosity, and σ is the ionic conductivity.
[b] The uncertainty in η is approximately ±5%.

Example 2

Thermophysical Properties of the Protic Ionic Liquids

Select thermophysical properties of eight of the exemplary PILs are shown in Table 2 below. Both thermogravimetric (TGA) and differential scanning calorimetry (DSC) testing was performed on select exemplary PILs.

TABLE 2

Thermal properties of superbase-derived PILs[a]

| Superbase | $T_{fus}$/° C. | | $T_{dep}$/° C. | |
|---|---|---|---|---|
| | Tf₂N | beti | Tf₂N | beti |
| t-BuP₁(dma) | 130 | 108 | 324 | 321 |
| t-BuP₁(pyrr) | 136 | — | 323 | 322 |
| BEMP | — | 135 | 300 | 311 |
| HP₁(dma) | — | 122 | 325 | 325 |
| EtP₂(dma) | — | — | 347 | 319 |
| MTBD | — | — | 379 | 383 |
| HTBD | — | — | 371 | 338 |
| HNC(dma) | — | — | 297 | 302 |

[a] $T_{fus}$ is the temperature of fusion measured from DSC and $T_{dcp}$ is the decomposition temperature corresponding to a 10% mass loss measured using TGA. The shaded regions denote formulations that meet the arbitrary ionic liquid definition of possessing $T_{fus}$ values below 100° C. The unshaded $T_{fus}$ values represent borderline cases.

Figure 2:
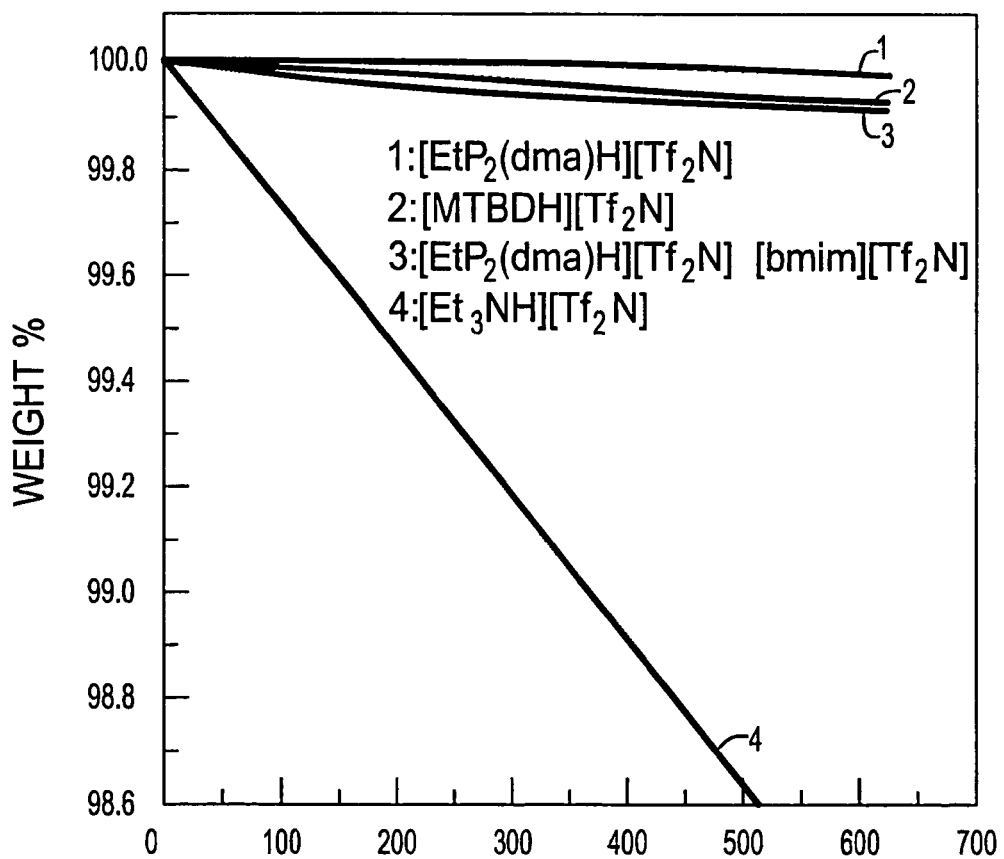
FIG. 2. Isothermal TGA scans conducted under nitrogen ($N_2$) atmosphere at 150° C. showing the superior thermal stability of $[EtP_2(dma)H][Tf_2N]$ and $[MTBDH][Tf_2N]$ as compared to the conventional PIL $[Et_3NH][Tf_2N]$.
Figure 3:
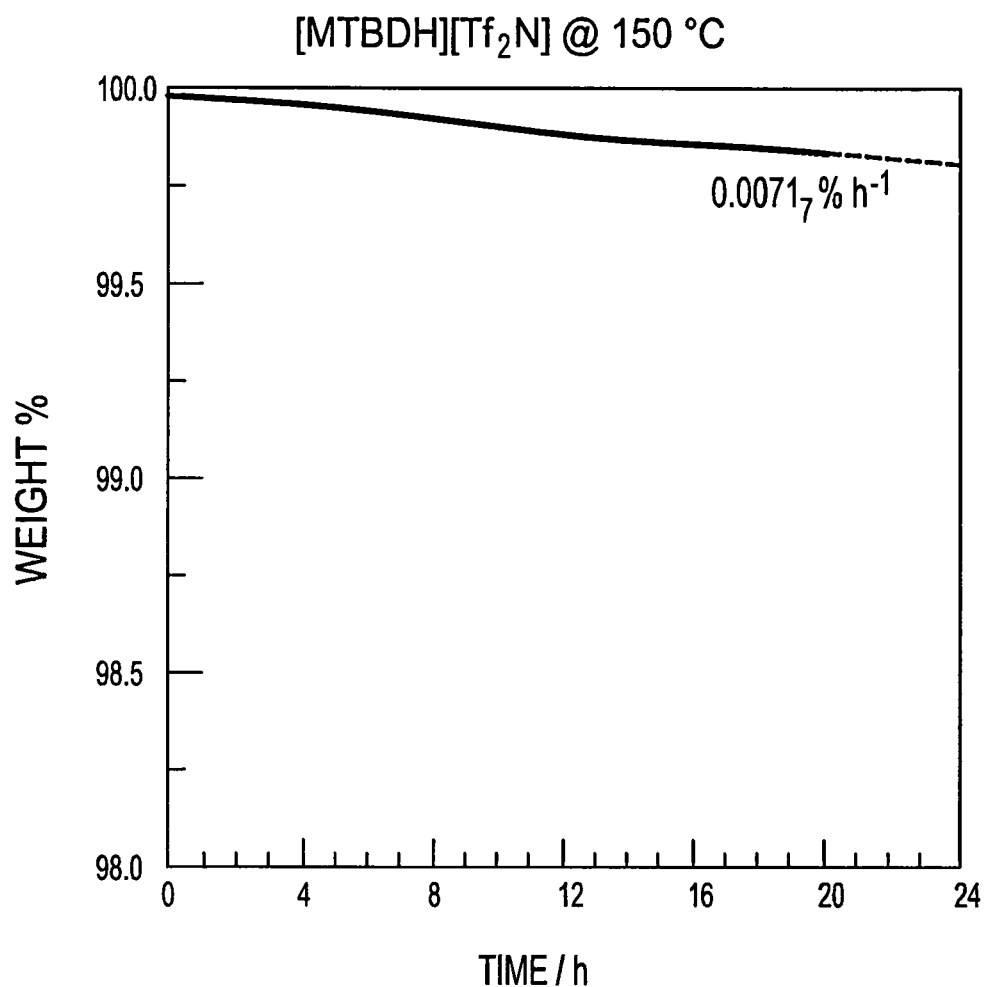
FIG. 3. Isothermal TGA scan for $[MTBDH][Tf_2N]$ at 150° C. under flowing nitrogen (60 mL/min). The short dashed profile shows the linear regression line resulting from these data.
Figure 4:
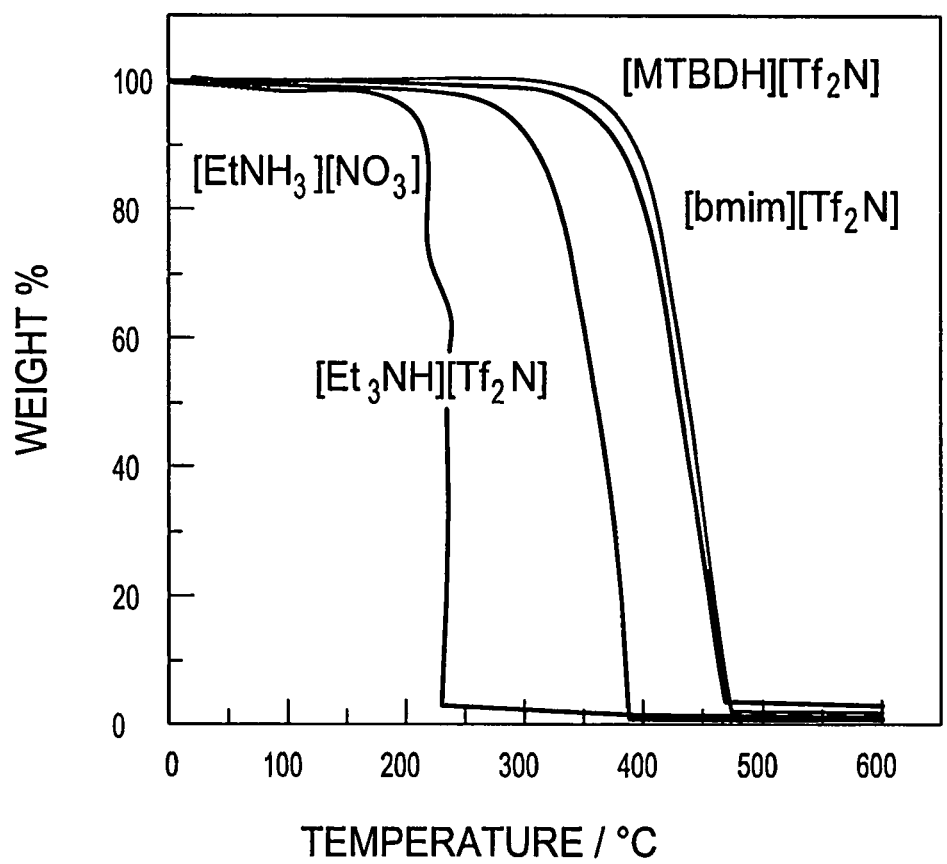
FIG. 4. TGA profile for the superbase-derived PIL $[MTBDH][Tf_2N]$ compared to those of two conventional PILs ($[EtNH_3][NO_3]$ and $[Et_3NH][Tf_2N]$), and that for the prototype aprotic ionic liquid (AIL) $[BMIM][Tf_2N]$. Measurements were performed under nitrogen using a scan rate of 10° C./min.
Figure 5:
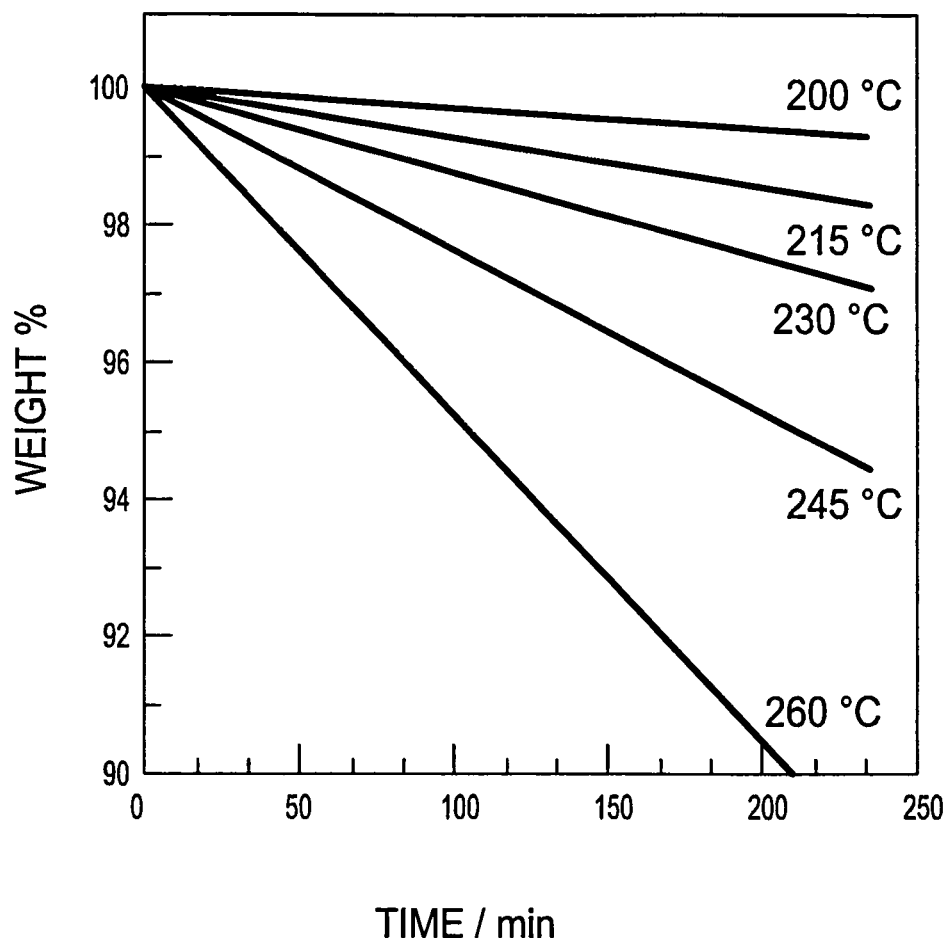
FIG. 5. Time-dependent isothermogravimetry curves of $[MTBDH][Tf_2]$ showing the linear mass losses at five discrete temperatures.
Figure 6:
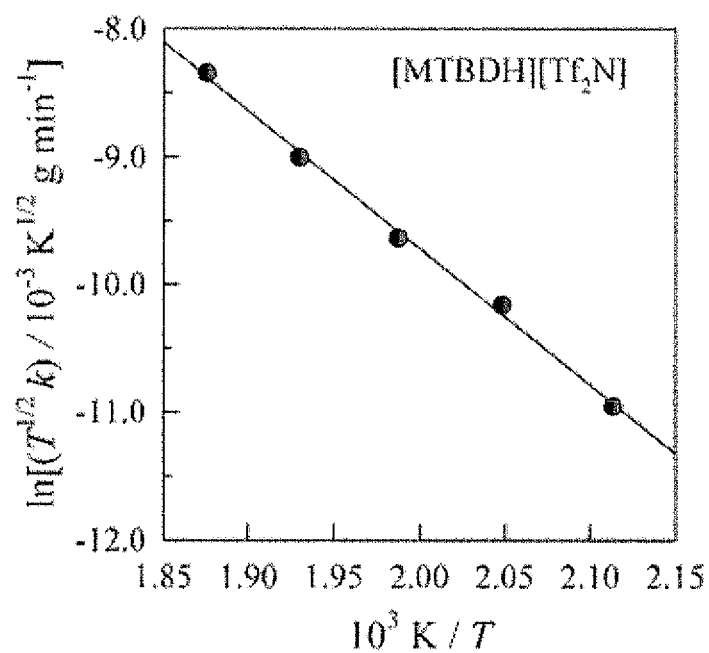
FIG. 6. Graph showing temperature dependence of the mass loss of $[MTBDH][Tf_2N]$, based on the results summarized in FIG. 5. The plot yields a gradient of $\Delta_{vap}H/R$, where $\Delta_{vap}H$ is the vaporization enthalpy, R is the gas constant, T is the Kelvin temperature, and k equals the observed rate of mass loss normalized to vessel cross section.

As shown by Table 2, their thermal decomposition temperatures ($T_{dcp}$) of the eight shown PILs fall in the 300-380° C. range, which is considerably above the operating temperature of PEM fuel cells. With this in mind, selected PILs were tested at 150° C. for a period of several hours using TGA. These results are shown in FIG. 2 (see also FIG. 3). Clearly, the weight losses of these superbase PILs are significantly lower than those of conventional ammonium-based PILs bearing the same anion, such as [Et₃NH][Tf₂N]. Quite remarkably, the superbase-derived PIL [MTBDH][Tf₂N] exhibited kinetic TGA characteristics similar to that of [BMIM][Tf2N] (see FIG. 4). Moreover, based on the linear (zero-order) evaporative mass losses for [MTBDH] [Tf₂N] at several temperatures well below $T_{dcp}$ (FIG. 5), an enthalpy of vaporization, $\Delta_{vap}H$, of 89 kJ mol⁻¹ was estimated for this PIL (FIG. 6), a number ca. 25% below the value determined for [BMIM][Tf₂N] using the same isothermogravimetric approach.

Figure 7:
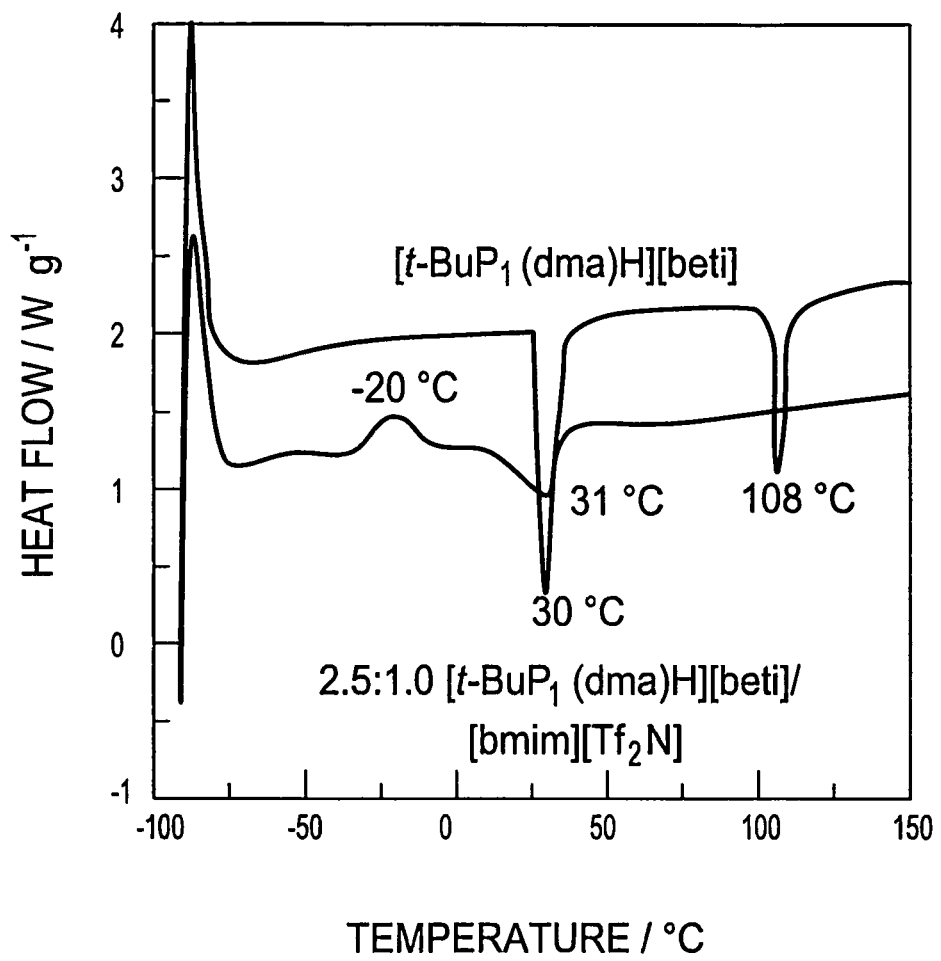
FIG. 7. DSC thermogram (warming cycle, 20° C./min) of neat $[t-BuP_1(dma)H][BETI]$ (upper curve) illustrating the measurement of the melting temperature, Tfus, and the formation of a eutectic melting near ambient via addition of 28.5 vol % of the AIL $[BMIM][Tf_2N]$ (lower curve).

Of the 16 newly synthesized PILs, only five possess melting points outside the classic ionic liquid range. However, even in these cases, the liquidus temperature can be greatly reduced by simple eutectic mixing with conventional AILs. For instance, the borderline PIL [t-BuP1(dma)H][BETI], which has a $T_{fus}$ of 108° C., forms a liquid system near ambient temperature when mixed with 28 vol % [BMIM][Tf₂N] (BMIM=1-butyl-3-methylimidazolium). The DSC curves showing these results are given in FIG. 7.

Example 3

Stability Analyses of the Protic Ionic Liquids

Figure 8A:
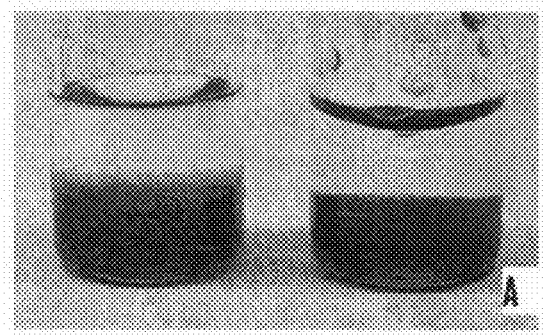
FIGS. 8A, 8B, 8C, $[Et_3NH][Tf_2N]$ (left vial) and $[MTBDH][Tf_2N]$ (right vial) dyed with Nile Red before (FIG. 8A) and after (FIG. 8B) addition of concentrated KOH (aq).
Figure 8B:
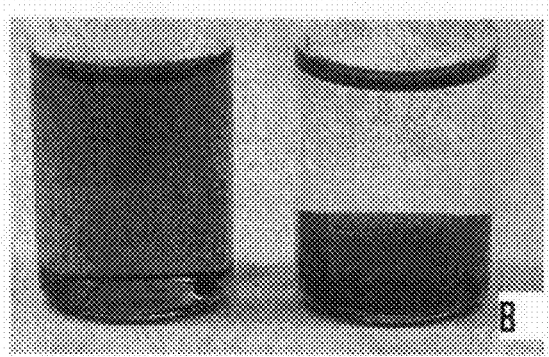
Figure 8C:
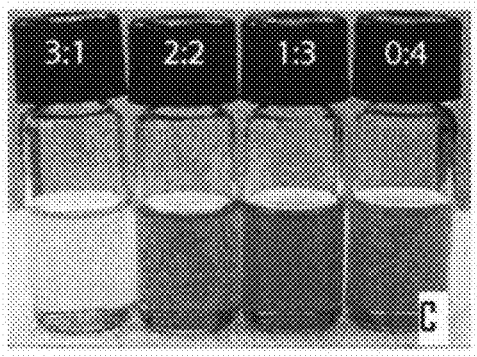
Figures 9A, 9B:
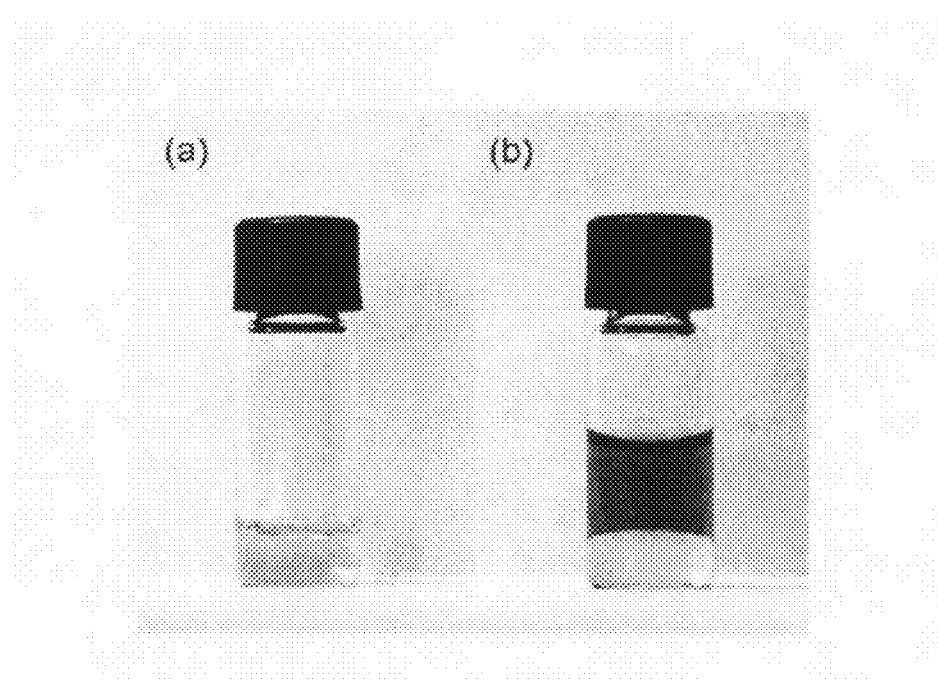
FIG. 9. $[Et_3NH][Tf_2N]$ (left vial) and $[MTBDH][Tf_2N]$ (right vial) in the presence of 1.0 N aqueous KOH containing the indicator Thymol Blue (TB).

As illustrated in FIGS. 8A (before KOH addition) and 8B (after KOH addition), [MTBDH][Tf₂N] (right vial) remains stable when contacted with 1.0 N KOH solution in the presence of the indicator Nile Red, an observation consistent with the superbasicity of MTBD. In sharp contrast, for the conventional PIL [Et₃NH][Tf₂N] (left vial), the biphase degrades almost instantaneously to form an aqueous solution under these conditions, developing autogenous pressure during the process if a sealed vessel is used. Using the positive solvatochromic probe Nile Red (NR), it is also noted that the polarity of [MTBDH][Tf₂N] is somewhat lower than that of conventional PILs such as [Et₃NH][Tf₂N] ($E_{NR}$ values are 214.0 and 209.1 kJ·mol⁻¹, respectively). This trend can be discerned by visual inspection of water/EtOH mixtures containing NR (FIG. 8C). However, both PILs remain more polar than [BMIM][Tf2N] which has an ENR akin to EtOH (218 kJ mol⁻¹). (Jin, H., et al., *J. Phys. Chem. B* 2008, 112, 81; Ogihara, W., et al., *Chem. Lett.,* 2004, 33, 1414; Carmichael, A., et al., *J. Phys. Org. Chem.* 2000, 13, 591). This behavior is further evidenced by use of Thymol Blue (TB), as shown in FIG. 9. As shown, [Et₃NH][Tf₂N] (left vial) is clear whereas [MTBDH] [Tf₂N] is blue in presence of KOH and TB (wherein it is understood that TB is red to yellow at pH of 1.2-2.8 and yellow to blue at pH of 8.0-9.6). The foregoing is evidence that [Et₃NH][Tf₂N] has reacted with KOH whereas [MTBDH][Tf₂N] has not, thereby showing the greater stability (i.e., lack of reactivity and resistance to degradation) of [MTBDH][Tf₂N].

While there have been shown and described what are at present considered the preferred embodiments of the invention, those skilled in the art may make various changes and modifications which remain within the scope of the invention defined by the appended claims.

What is claimed is:

1. An ionic liquid having a composition of formula (A⁻)(BH⁺) wherein A⁻ is a conjugate base of an acid HA, and BH⁺ is a conjugate acid of a superbase B.

2. The ionic liquid of claim 1, wherein BH⁺ has a composition according to the chemical formula:

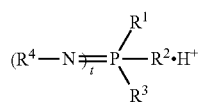

(2)

wherein R¹, R², and R³ are each independently selected from:
(i) hydrocarbon groups bound to P in formula (2) by a carbon atom, wherein said hydrocarbon groups are optionally and independently substituted with one or more heteroatoms or heteroatom groups;
(ii) amino groups bound to P in formula (2) by a nitrogen atom, said amino group is according to the chemical formula:

—NR¹²R¹³ (1)

wherein R¹² and R¹³ are each independently selected from a hydrogen atom and hydrocarbon groups, wherein said hydrocarbon groups are optionally and independently substituted with one or more heteroatoms or heteroatom groups, and optionally, R¹² and R¹³ are interconnected to form a cyclic, bicyclic, or polycyclic amino group;
(iii) imino groups derived from formula (1) wherein R¹² and R¹³ together represent a double bond connecting the shown nitrogen atom to a carbon atom, as depicted in the following chemical formula:

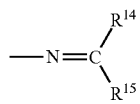

(1a)

wherein R¹⁴ and R¹⁵ are each independently selected from a hydrogen atom, hydrocarbon groups, and amino groups according to formula (1), wherein said hydrocarbon groups are optionally and independently substituted with one or more heteroatoms or heteroatom groups, and optionally, R¹⁴ and R¹⁵ are interconnected to form a cyclic, bicyclic, or polycyclic imino group; and (iv) phosphazeno groups derived from formula (1) wherein R¹² and R¹³ together represent a double bond connecting the shown nitrogen atom to a phosphorus atom, as depicted in the following chemical formula:

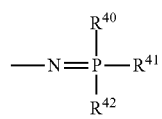

(1b)

wherein R⁴⁰, R⁴¹ and R⁴² are independently selected from hydrocarbon groups, amino groups according to formula (1), and imino groups according to formula (1a), wherein said hydrocarbon groups are optionally and independently substituted with one or more heteroatoms or heteroatom groups, and optionally, two or three of R⁴⁰, R⁴¹ and R⁴² are interconnected to form a cyclic, bicyclic, or polycyclic phosphazeno group;

R⁴ is either a hydrogen atom or hydrocarbon group, wherein said hydrocarbon groups are optionally and independently substituted with one or more heteroatoms or heteroatom groups;

subscript t is 0 or 1, to indicate, respectively, the absence or presence of the group R⁴—N=, provided that when t is 0, at least one of R¹, R², and R³ is an amino group, imino group, or phosphazeno group shown, respectively, by formulas (1), (1a), and (1b); and optionally, two or more of R¹, R², and R³ are interconnected.

3. The ionic liquid of claim 2, wherein BH⁺ has a composition according to the chemical formula:

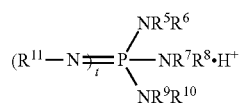

(3)

wherein R⁵, R⁶, R⁷, R⁸, R⁹, R¹⁰, and R¹¹ are each independently selected from a hydrogen atom and hydrocarbon group, wherein said hydrocarbon group is optionally and independently substituted with one or more heteroatoms or heteroatom groups;

optionally, two or more of R⁵, R⁶, R⁷, R⁸, R⁹, and R¹⁰ are interconnected;

optionally, one, two, or all of —NR⁵R⁶, —NR⁷R⁸, and —NR⁹R¹⁰ are independently selected from imino groups of formula (1a) and/or phosphazeno groups of formulas (1b); and subscript t is 0 or 1, to indicate, respectively, the absence or presence of the group R¹¹—N—.

4. The ionic liquid of claim 3, wherein at least one of —NR⁵R⁶, —NR⁷R⁸, and —NR⁹R¹⁰ is selected from imino groups of formula (1a) and/or phosphazeno groups of formulas (1b).

5. The ionic liquid of claim 3, wherein at least one of —NR⁵R⁶, —NR⁷R⁸, and —NR⁹R¹⁰ is selected from phosphazeno groups of formulas (1b).

6. The ionic liquid of claim 3, wherein at least one of —NR⁵R⁶, —NR⁷R⁸, and —NR⁹R¹⁰ is selected from imino groups of formula (1a).

7. The ionic liquid of claim 6, wherein —NR⁵R⁶, —NR⁷R⁸, and —NR⁹R¹⁰ are all independently selected from imino groups of formula (1a), wherein BH⁺ has a composition according to the chemical formula:

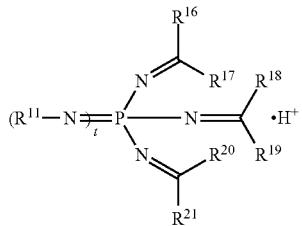

(4)

wherein $R^{11}$, $R^{16}$, $R^{17}$, $R^{18}$, $R^{19}$, $R^{20}$, and $R^{21}$ are each independently selected from a hydrogen atom, hydrocarbon groups, amino groups according to formula (1), imino groups according to formula (1a), and phosphazeno groups according to formula (1b), wherein said hydrocarbon groups are optionally and independently substituted with one or more heteroatoms or heteroatom groups;

optionally, two or three of $R^{16}$, $R^{17}$, $R^{18}$, $R^{19}$, $R^{20}$, and $R^{21}$ are interconnected; and t is 0 or 1, to indicate, respectively, the absence or presence of the group $R^{11}$—N=.

8. The ionic liquid of claim 7, wherein at least one of $R^{16}$, $R^{17}$, $R^{18}$, $R^{19}$, $R^{20}$, and $R^{21}$ is selected from amino groups according to formula (1), imino groups according to formula (1a), and phosphazeno groups according to formula (1b).

9. The ionic liquid of claim 3, wherein BH⁺ has a composition according to the chemical formula:

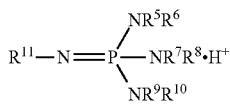

(3a)

wherein $R^5$, $R^6$, $R^7$, $R^8$, $R^9$, $R^{10}$, and $R^{11}$ are each independently selected from a hydrogen atom and hydrocarbon group, wherein said hydrocarbon group is optionally and independently substituted with one or more heteroatoms or heteroatom groups;

optionally, two or more of $R^5$, $R^6$, $R^7$, $R^8$, $R^9$, and $R^{10}$ are interconnected; and optionally, one, two, or all of —NR⁵R⁶, —NR⁷R⁸, and —NR⁹R¹⁰ are independently selected from imino groups of formula (1a) and/or phosphazeno groups of formulas (1b).

10. The ionic liquid of claim 9, wherein at least one of —NR⁵R⁶, —NR⁷R⁸, and —NR⁹R¹⁰ is selected from imino groups of formula (1a) and/or phosphazeno groups of formulas (1b).

11. The ionic liquid of claim 9, wherein at least one of —NR⁵R⁶, —NR⁷R⁸, and —NR⁹R¹⁰ is selected from phosphazeno groups of formulas (1b).

12. The ionic liquid of claim 9, wherein at least one of —NR⁵R⁶, —NR⁷R⁸, and —NR⁹R¹⁰ is selected from imino groups of formula (1a).

13. The ionic liquid of claim 9, wherein —NR⁵R⁶, —NR⁷R⁸, and —NR⁹R¹⁰ are all independently selected from imino groups of formula (1a), wherein BH⁺ has a composition according to the chemical formula:

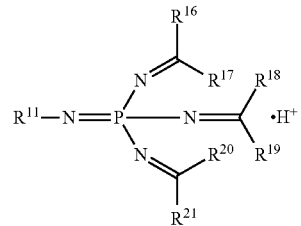

(4a)

wherein $R^{11}$, $R^{16}$, $R^{17}$, $R^{18}$, $R^{19}$, $R^{20}$, and $R^{21}$ are each independently selected from a hydrogen atom, hydrocarbon groups, amino groups according to formula (1), imino groups according to formula (1a), and phosphazeno groups according to formula (1b), wherein said hydrocarbon groups are optionally and independently substituted with one or more heteroatoms or heteroatom groups; and optionally, two or three of $R^{16}$, $R^{17}$, $R^{18}$, $R^{19}$, $R^{20}$, and $R^{21}$ are interconnected.

14. The ionic liquid of claim 12, wherein at least one of $R^{16}$, $R^{17}$, $R^{18}$, $R^{19}$, $R^{20}$, and $R^{21}$ is selected from amino groups according to formula (1), imino groups according to formula (1a), and phosphazeno groups according to formula (1b).

15. The ionic liquid of claim 3, wherein t is 0 such that BH⁺ has a composition according to the chemical formula:

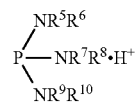

(6)

wherein $R^5$, $R^6$, $R^7$, $R^8$, $R^9$, $R^{10}$, and $R^{11}$ are each independently selected from a hydrogen atom and hydrocarbon groups, wherein said hydrocarbon groups are optionally and independently substituted with one or more heteroatoms or heteroatom groups;

optionally, two or more of $R^5$, $R^6$, $R^7$, $R^8$, $R^9$, and $R^{10}$ are interconnected; and optionally, one, two, or all of —NR⁵R⁶, —NR⁷R⁸, and —NR⁹R¹⁰ are independently selected from imino groups of formula (1a) and/or phosphazeno groups of formulas (1b).

16. The ionic liquid of claim 15, wherein at least one of $R^5$ and $R^6$ is interconnected with one or two of $R^7$, $R^8$, $R^9$, and $R^{10}$.

17. The ionic liquid of claim 15, wherein $R^6$, $R^8$, and $R^{10}$ are interconnected.

18. The ionic liquid of claim 17, wherein BH⁺ has a composition according to the chemical formula:

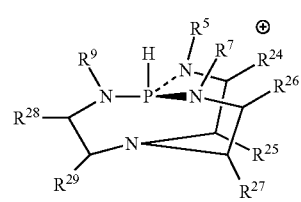

(6f)

wherein $R^5$, $R^7$, $R^9$, $R^{24}$, $R^{25}$, $R^{26}$, $R^{27}$, $R^{28}$, and $R^{29}$ are each independently selected from a hydrogen atom and hydrocarbon groups, wherein said hydrocarbon groups are optionally and independently substituted with one or more heteroatoms or heteroatom groups.

19. The ionic liquid of claim 3, wherein at least one of $R^5$, $R^6$, $R^7$, $R^8$, $R^9$, $R^{10}$, and $R^{11}$ is a phosphorus-containing group wherein a phosphorus atom contained therein is bound to a nitrogen atom shown in formula (3).

20. The ionic liquid of claim 19, wherein said phosphorus-containing group has the following chemical structure:

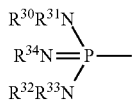
(11)

wherein $R^{30}$, $R^{31}$, $R^{32}$, $R^{33}$, and $R^{34}$ are independently selected from a hydrogen atom and hydrocarbon groups, wherein said hydrocarbon groups are optionally and independently substituted with one or more heteroatoms or heteroatom groups.

21. The ionic liquid of claim 20, wherein $BH^+$ has a composition according to the chemical formula:

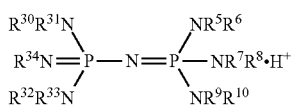
(13)

wherein $R^5$, $R^6$, $R^7$, $R^8$, $R^9$, $R^{10}$, $R^{30}$, $R^{31}$, $R^{32}$, $R^{33}$, and $R^{34}$ are each independently selected from a hydrogen atom and hydrocarbon groups, wherein said hydrocarbon groups are optionally and independently substituted with one or more heteroatoms or heteroatom groups, and optionally, the shown amino groups —$NR^5R^6$, —$NR^7R^8$, —$NR^9R^{10}$, —$NR^{30}R^{31}$, and —$NR^{32}R^{33}$ are independently selected from imino groups of formula (1a) and/or phosphazeno groups of formulas (1b), and optionally, any two or more groups selected from $R^5$, $R^6$, $R^7$, $R^8$, $R^9$, $R^{10}$, $R^{30}$, $R^{31}$, $R^{32}$, $R^{33}$, and $R^{34}$ are interconnected.

22. The ionic liquid of claim 21, wherein $R^{34}$ is substituted with a phosphorus-containing group of formula (11) such that $BH^+$ has a composition according to the chemical formula:

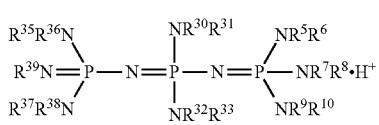
(12)

wherein $R^5$, $R^6$, $R^7$, $R^8$, $R^9$, $R^{10}$, $R_{30}$, $R^{31}$, $R^{32}$, $R^{33}$, $R^{35}$, $R^{36}$, $R^{37}$, $R^{38}$, and $R^{39}$ are each independently selected from a hydrogen atom and hydrocarbon groups, wherein said hydrocarbon groups are optionally and independently substituted with one or more heteroatoms or heteroatom groups, and optionally, the shown amino groups —$NR^5R^6$, —$NR^7R^8$, —$NR^9R^{10}$, —$NR^{30}R^{31}$, —$NR^{32}R^{33}$, —$NR^{35}R^{36}$, and —$NR^{37}R^{38}$ are independently selected from imino groups of formula (1a) and/or phosphazeno groups of formulas (1b), and optionally, any two or more groups selected from $R^5$, $R^6$, $R^7$, $R^8$, $R^9$, $R^{10}$, $R^{30}$, $R^{31}$, $R^{32}$, $R^{33}$, $R^{35}$, $R^{36}$, $R^{37}$, $R^{38}$, and $R^{39}$ are interconnected.

23. The ionic liquid of claim 3, wherein one, two, or all of —$NR^5R^6$, —$NR^7R^8$, and —$NR^9R^{10}$ are independently selected from imino groups of formula (1a) and/or phosphazeno groups of formulas (1b).

24. The ionic liquid of claim 3, wherein at least one of —$NR^5R^6$, —$NR^7R^8$, and —$NR^9R^{10}$ is selected from phosphazeno groups of formulas (1b).

25. The ionic liquid of claim 24, wherein all of —$NR^5R^6$, —$NR^7R^8$, and —$NR^9R^{10}$ are independently selected from phosphazeno groups of formulas (1b) such that $BH^+$ has a composition according to the chemical formula:

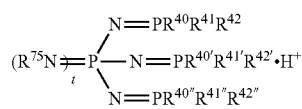
(5)

wherein $R^{40}$, $R^{41}$, $R^{42}$, $R^{40'}$, $R^{41'}$, $R^{42'}$, $R^{40''}$, $R^{41''}$, and $R^{42''}$ are independently selected from hydrocarbon groups, amino groups according to formula (1), imino groups according to formula (1a), and phosphazeno groups according to formula (1b), $R^{75}$ is selected from a hydrogen atom and hydrocarbon groups, wherein said hydrocarbon groups are optionally and independently substituted with one or more heteroatoms or heteroatom groups; t is 0 or 1; and optionally, two or more groups selected from $R^{40}$, $R^{41}$, $R^{42}$, $R^{40'}$, $R^{41'}$, $R^{42'}$, $R^{40''}$, $R^{41''}$, $R^{42''}$ and $R^{75}$ are interconnected.

26. The ionic liquid of claim 25, wherein at least one of $R^{40}$, $R^{41}$, $R^{42}$, $R^{40'}$, $R^{41'}$, $R^{42'}$, $R^{40''}$, $R^{41''}$, and $R^{42''}$ is selected from said amino groups.

27. The ionic liquid of claim 25, wherein $R^{40}$, $R^{41}$, $R^{42}$, $R^{40'}$, $R^{41'}$, $R^{42'}$, $R^{40''}$, $R^{41''}$, and $R^{42''}$ are independently selected from said amino groups.

28. The ionic liquid of claim 25, wherein t is 0 such that $BH^+$ has a composition according to the chemical formula:

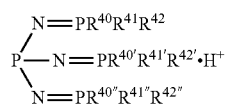
(8)

wherein $R^{40}$, $R^{41}$, $R^{42}$, $R^{40'}$, $R^{41'}$, $R^{42'}$, $R^{40''}$, $R^{41''}$, and $R^{42''}$ are as defined in claim 25.

29. The ionic liquid of claim 25, wherein t is 1 such that $BH^+$ has a composition according to the chemical formula:

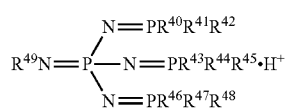
(14)

wherein $R^{40}$, $R^{41}$, $R^{42}$, $R^{40'}$, $R^{41'}$, $R^{42'}$, $R^{40''}$, $R^{41''}$, $R^{42''}$ and $R^{75}$ are as defined in claim 25.

30. The ionic liquid of claim 1, wherein $BH^+$ has a composition according to the chemical formula:

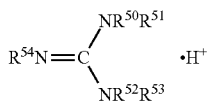

(15)

wherein $R^{50}$, $R^{51}$, $R^{52}$, $R^{53}$, and $R^{54}$ are each independently selected from a hydrogen atom, hydrocarbon groups, and phosphorus-containing groups of formula (11), wherein said hydrocarbon groups are optionally and independently substituted with one or more heteroatoms or heteroatom groups;

optionally, one or both of —NR$^{50}$R$^{51}$ and —NR$^{52}$R$^{53}$ are independently selected from imino groups of formula (1a) and/or phosphazeno groups of formula (1b);

and optionally, two or more of $R^{50}$, $R^{51}$, $R^{52}$, $R^{53}$, and $R^{54}$ are interconnected.

31. The ionic liquid of claim 30, wherein BH$^+$ has a composition according to the chemical formula:

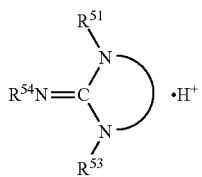

(16)

wherein $R^{51}$, $R^{53}$, and $R^{54}$ are as defined in claim 30, and the curve shown in the formula represents a linking group that interconnects the two shown nitrogen atoms.

32. The ionic liquid of claim 31, wherein said linker is a trimethylene linker, such that BH$^+$ has a composition according to the chemical formula:

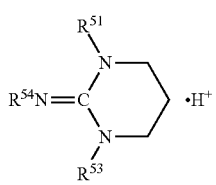

(16a)

wherein $R^{51}$, $R^{53}$, and $R^{54}$ are each independently selected from a hydrogen atom, hydrocarbon groups, and phosphorus-containing groups of formula (11), wherein said hydrocarbon groups are optionally and independently substituted with one or more heteroatoms or heteroatom groups.

33. The ionic liquid of claim 30, wherein BH$^+$ has a composition according to the chemical formula:

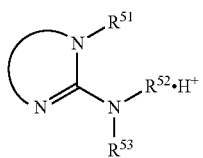

(17)

wherein $R^{51}$, $R^{52}$, and $R^{53}$ are as defined in claim 30, and the curve shown in the formula represents a linking group that interconnects the two shown nitrogen atoms.

34. The ionic liquid of claim 33, wherein said linker is a trimethylene linker such that BH$^+$ has a composition according to the chemical formula:

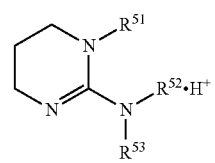

(17a)

wherein $R^{51}$, $R^{53}$, and $R^{54}$ are each independently selected from a hydrogen atom, hydrocarbon groups, and phosphorus-containing groups of formula (11), wherein said hydrocarbon groups are optionally and independently substituted with one or more heteroatoms or heteroatom groups.

35. The ionic liquid of claim 30, wherein BH$^+$ has a composition according to the chemical formula:

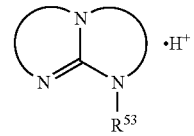

(18)

wherein $R^{53}$ is as defined in claim 30, and each curve shown in the formula independently represents a linking group that interconnects two shown nitrogen atoms.

36. The ionic liquid of claim 35, wherein said linkers are both trimethylene linkers such that BH$^+$ has a composition according to the chemical formula:

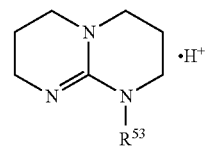

(18a)

wherein $R^{53}$ is selected from a hydrogen atom, hydrocarbon groups, and phosphorus-containing groups of formula (11), wherein said hydrocarbon groups are optionally and independently substituted with one or more heteroatoms or heteroatom groups.

37. The ionic liquid of claim 30, wherein one or both of the amino groups —NR$^{50}$R$^{51}$ and —NR$^{52}$R$^{53}$ are independently selected from imino groups of formula (1a) and/or phosphazeno groups of formulas (1b).

38. The ionic liquid of claim 34, wherein both of the amino groups —NR$^{50}$R$^{51}$ and —NR$^{52}$R$^{53}$ are independently selected from imino groups of formula (1a) such that BH$^+$ has a composition according to the chemical formula:

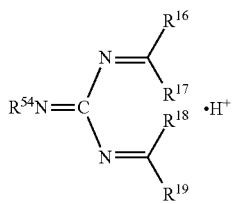

(19)

wherein $R^{16}$, $R^{17}$, $R^{18}$, and $R^{19}$ are each independently selected from a hydrogen atom, hydrocarbon groups, amino groups of formula (1), imino groups of formula (1a), and phosphazeno groups of formula (1b), and $R^{54}$ is selected from a hydrogen atom hydrocarbon groups, wherein said hydrocarbon groups are optionally and independently substituted with one or more heteroatoms or heteroatom groups; and optionally, two or more of $R^{16}$, $R^{17}$, $R^{18}$, $R^{19}$, and $R^{54}$ are interconnected.

39. The ionic liquid of claim 38, wherein at least one of $R^{16}$, $R^{17}$, $R^{18}$, and $R^{19}$ is selected from said amino groups.

40. The ionic liquid of claim 39, wherein all of $R^{16}$, $R^{17}$, $R^{18}$, and $R^{19}$ are selected from said amino groups, such that $BH^+$ has a composition according to the chemical formula:

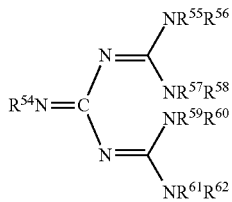

(19a)

wherein $R^{54}$, $R^{55}$, $R^{56}$, $R^{57}$, $R^{58}$, $R^{59}$, $R^{60}$, $R^{61}$, and $R^{62}$ are each independently selected from a hydrogen atom and hydrocarbon groups, wherein said hydrocarbon groups are optionally and independently substituted with one or more heteroatoms or heteroatom groups;

optionally, the amino groups $-NR^{55}R^{56}$, $-NR^{57}R^{58}$, $-NR^{59}R^{60}$, and $-NR^{61}R^{62}$ of formula are selected from imino groups according to formula (1a) and/or phosphazeno groups according to formula (1b); and optionally, two or more of $R^{55}$, $R^{56}$, $R^{57}$, $R^{58}$, $R^{59}$, $R^{69}$, $R^{61}$, and $R^{62}$ are interconnected.

41. The ionic liquid of claim 1, wherein $A^-$ is a conjugate base of a superacid HA.

42. The ionic liquid of claim 41, wherein $A^-$ has a composition according to the chemical formula:

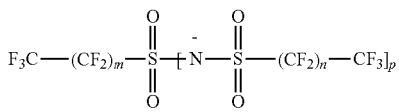

(20)

wherein m and n are independently 0 or an integer of 1 or above, and p is 0 or 1, provided that when p is 0, the group $-N-SO_2-(CF_2)_nCF_3$ subtended by p is replaced with an oxide atom connected to the sulfur atom, and when p is 1, the shown perfluoroalkyl groups can optionally crosslink to form a cyclic anion.

43. The ionic liquid of claim 42, wherein $A^-$ has a composition according to the chemical formula:

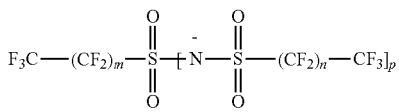

(21)

wherein m and n are independently 0 or an integer of 1 or above.

44. The ionic liquid of claim 42, wherein $A^-$ has a composition according to the chemical formula:

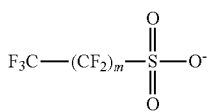

(23)

wherein m is 0 or an integer of at least 1.

45. An ionic liquid-containing film useful as a proton exchange membrane for a fuel cell, the ionic liquid-containing film comprising the ionic liquid of claim 1.

46. An ionic liquid-containing film useful as a proton exchange membrane for a fuel cell, the ionic liquid-containing film comprising the ionic liquid of claim 2.

47. An ionic liquid-containing film useful as a proton exchange membrane for a fuel cell, the ionic liquid-containing film comprising the ionic liquid of claim 30.

48. An ionic liquid-containing film useful as a proton exchange membrane for a fuel cell, the ionic liquid-containing film comprising the ionic liquid of claim 41.

* * * * *